US009547481B2

(12) United States Patent
Avadhanula et al.

(10) Patent No.: US 9,547,481 B2
(45) Date of Patent: *Jan. 17, 2017

(54) TEXTUAL CODE PROVIDED IN TEMPORAL AND CHANGE OPERATORS OF A TECHNICAL COMPUTING ENVIRONMENT

(71) Applicant: The MathWorks, Inc., Natick, MA (US)

(72) Inventors: Srinath Avadhanula, Sudbury, MA (US); Pieter J. Mosterman, Framingham, MA (US); Ebrahim Mestchian, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/286,023

(22) Filed: May 23, 2014

(65) Prior Publication Data
US 2014/0359567 A1    Dec. 4, 2014

Related U.S. Application Data

(60) Provisional application No. 61/827,863, filed on May 28, 2013.

(51) Int. Cl.
*G06F 9/44* (2006.01)
*G06F 9/45* (2006.01)

(52) U.S. Cl.
CPC . *G06F 8/35* (2013.01); *G06F 8/10* (2013.01); *G06F 8/34* (2013.01); *G06F 8/51* (2013.01); *G06F 9/4425* (2013.01)

(58) Field of Classification Search
None
See application file for complete search history.

(56) References Cited

U.S. PATENT DOCUMENTS 5,313,574 A * 5/1994 Beethe ............... G06F 9/4843
                                              715/763
5,497,500 A * 3/1996 Rogers ............... G06F 3/0481
                                              714/E11.217

(Continued)

FOREIGN PATENT DOCUMENTS

WO    WO 2007/027622    3/2007

OTHER PUBLICATIONS

Notification of Transmittal of the International Search Report and The Written Opinion of the International Searching Authority, or the Declaration corresponding to PCT/US2014/039574, mailed on Nov. 10, 2014, 10 pages.

(Continued)

*Primary Examiner* — Emerson Puente
*Assistant Examiner* — Erika Kretzmer
(74) *Attorney, Agent, or Firm* — Harrity & Harrity, LLP

(57) ABSTRACT

A device receives a state chart that includes a state block, and receives a time-based or an event-based operator (time-based/event-based operator) associated with the state block. The time-based/event-based operator includes textual code understood by a textual engine of technical computing environment (TCE), and a portion of the time-based/event-based operator is not understood by a graphical engine of the TCE. The device transforms the portion of the time-based/event-based operator into a form that is understood by the graphical engine, and initiates execution of the state chart. The device processes, during the execution of the state chart, the transformed portion of the time-based/event-based operator and the state block with the graphical engine to generate graphical results. The device processes, during the execution of the state chart, the textual code of the time-based/event-based operator with the textual engine to gen- (Continued)

erate textual results, and combines the graphical results with the textual results.

20 Claims, 15 Drawing Sheets

(56) References Cited

U.S. PATENT DOCUMENTS

| | | | | |
|---|---|---|---|---|
| 5,821,934 A * | 10/1998 | Kodosky | ............ | G06F 3/04847 |
| | | | | 703/15 |
| 6,282,699 B1 | 8/2001 | Zhang et al. | | |
| 7,020,850 B2 * | 3/2006 | Raghavan et al. | ............ | 703/23 |
| 7,200,843 B2 * | 4/2007 | Shann | ............ | G06F 8/54 |
| | | | | 717/162 |
| 7,487,076 B2 * | 2/2009 | Szpak | ............ | G06F 17/5009 |
| | | | | 703/14 |
| 7,801,715 B2 * | 9/2010 | Ciolfi | ............ | G06F 17/5009 |
| | | | | 703/13 |
| 7,809,545 B2 * | 10/2010 | Ciolfi | ............ | G06F 8/34 |
| | | | | 703/22 |
| 7,810,077 B2 * | 10/2010 | Bracha | ............ | G06F 8/315 |
| | | | | 717/118 |
| 7,823,121 B1 * | 10/2010 | Zarrinkoub | ............ | G06F 8/34 |
| | | | | 715/763 |
| 7,941,303 B1 | 5/2011 | Raghavan et al. | | |
| 7,954,059 B2 * | 5/2011 | Macklem | ............ | G06F 8/34 |
| | | | | 715/234 |
| 7,975,233 B2 * | 7/2011 | Macklem | ............ | G06F 8/34 |
| | | | | 715/234 |
| 8,234,630 B2 * | 7/2012 | Raghavan et al. | ............ | 717/125 |
| 8,271,943 B2 * | 9/2012 | Hudson, III | ............ | G06F 8/34 |
| | | | | 717/113 |
| 8,423,981 B2 * | 4/2013 | Hudson, III | ............ | G06F 8/34 |
| | | | | 717/114 |
| 8,655,636 B2 * | 2/2014 | Kumar | ............ | G06F 8/34 |
| | | | | 703/13 |
| 8,782,599 B2 * | 7/2014 | Eldridge | ............ | G06F 8/34 |
| | | | | 717/104 |
| 8,793,602 B2 * | 7/2014 | Szpak | ............ | G06F 9/542 |
| | | | | 345/173 |
| 8,943,466 B2 * | 1/2015 | Bray | ............ | G06F 8/34 |
| | | | | 717/106 |
| 9,411,559 B2 * | 8/2016 | Avadhanula | ............ | G06F 8/35 |
| 2002/0170041 A1 * | 11/2002 | Shann | ............ | G06F 8/54 |
| | | | | 717/141 |
| 2003/0046658 A1 * | 3/2003 | Raghavan et al. | ............ | 717/106 |
| 2004/0210592 A1 * | 10/2004 | Ciolfi | ............ | G06F 8/34 |
| 2005/0096894 A1 * | 5/2005 | Szpak | ............ | G06F 17/5009 |
| | | | | 703/13 |
| 2005/0160397 A1 * | 7/2005 | Szpak | ............ | G06F 9/542 |
| | | | | 717/104 |
| 2005/0216248 A1 * | 9/2005 | Ciolfi | ............ | G06F 17/5009 |
| | | | | 703/22 |
| 2006/0139587 A1 * | 6/2006 | Rossing | ............ | G03F 7/70483 |
| | | | | 355/53 |
| 2006/0236315 A1 * | 10/2006 | Bracha | ............ | G06F 8/437 |
| | | | | 717/168 |
| 2007/0067761 A1 * | 3/2007 | Ogilvie | ............ | G06F 8/34 |
| | | | | 717/146 |
| 2007/0261019 A1 * | 11/2007 | Raghavan et al. | ............ | 717/105 |
| 2008/0022259 A1 * | 1/2008 | MacKlem | ............ | G06F 8/34 |
| | | | | 717/113 |
| 2008/0022264 A1 * | 1/2008 | Macklem | ............ | G06F 8/34 |
| | | | | 717/136 |
| 2008/0127058 A1 * | 5/2008 | Bray | ............ | G06F 8/34 |
| | | | | 717/106 |
| 2008/0270920 A1 * | 10/2008 | Hudson | ............ | G06F 8/34 |
| | | | | 715/763 |
| 2009/0327942 A1 * | 12/2009 | Eldridge | ............ | G06F 8/34 |
| | | | | 715/771 |
| 2010/0325617 A1 * | 12/2010 | Hudson, III | ............ | G06F 8/34 |
| | | | | 717/140 |
| 2011/0320178 A1 * | 12/2011 | Kumar | ............ | G06F 8/34 |
| | | | | 703/2 |
| 2014/0359560 A1 * | 12/2014 | Avadhanula et al. | ............ | 717/105 |
| 2014/0359561 A1 * | 12/2014 | Avadhanula et al. | ............ | 717/105 |
| 2014/0359566 A1 * | 12/2014 | Avadhanula et al. | ............ | 717/109 |
| 2014/0359567 A1 * | 12/2014 | Avadhanula et al. | ............ | 717/109 |
| 2014/0359568 A1 * | 12/2014 | Avadhanula et al. | ............ | 717/109 |
| 2014/0359569 A1 * | 12/2014 | Avadhanula et al. | ............ | 717/109 |
| 2015/0106781 A1 * | 4/2015 | Adler | ............ | G06F 9/4436 |
| | | | | 717/104 |

OTHER PUBLICATIONS

The MathWorks, "Stateflow® 7, User's Guide", The MathWorks, Inc., Matlab and Simulink, ©1997-2011, 1509 pages.

* cited by examiner

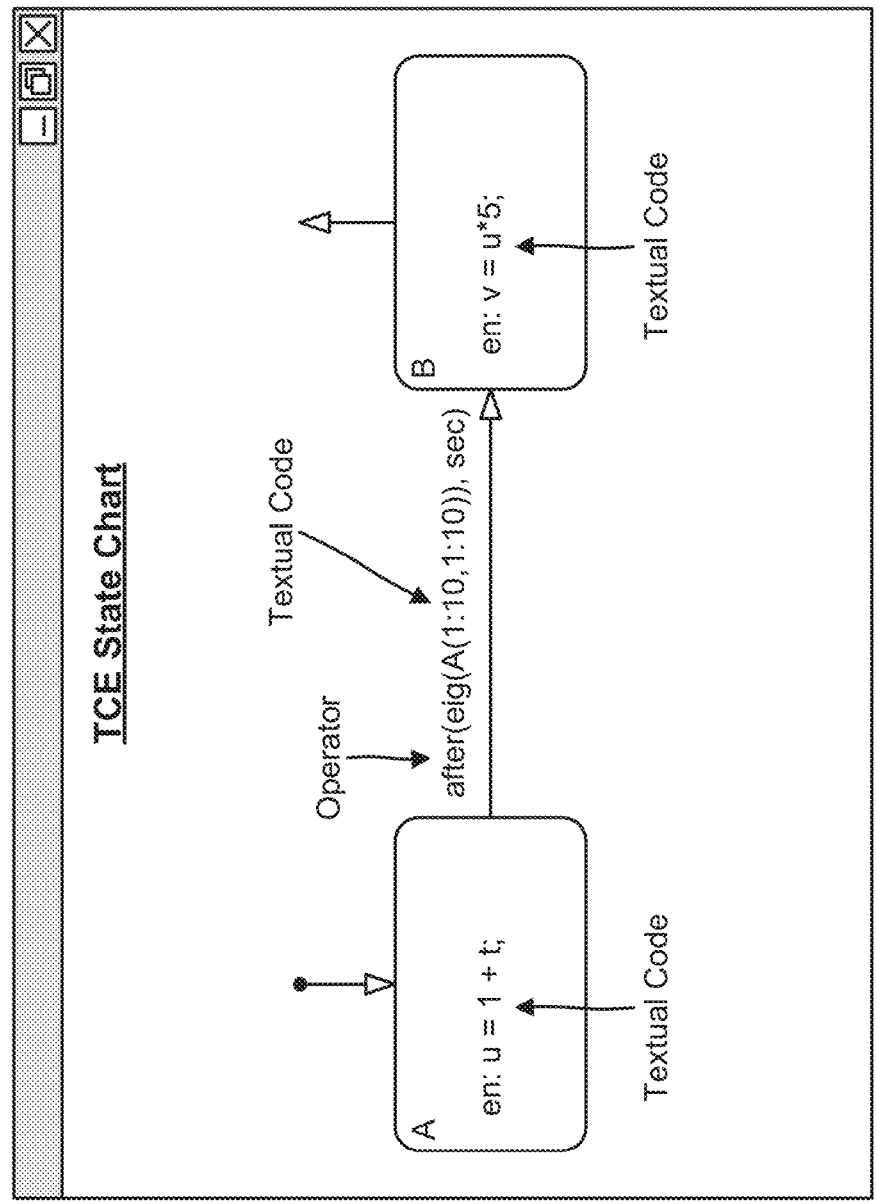

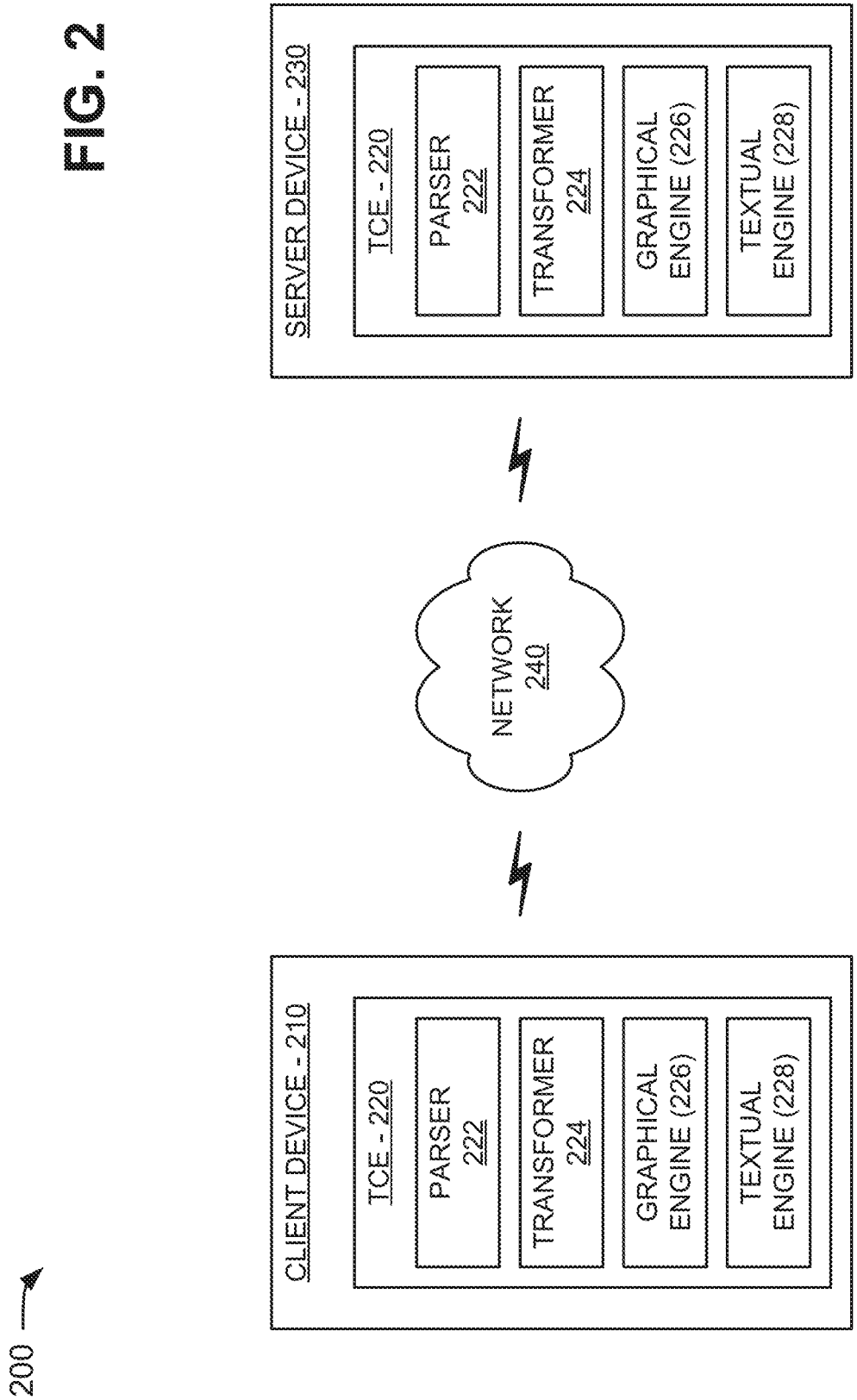

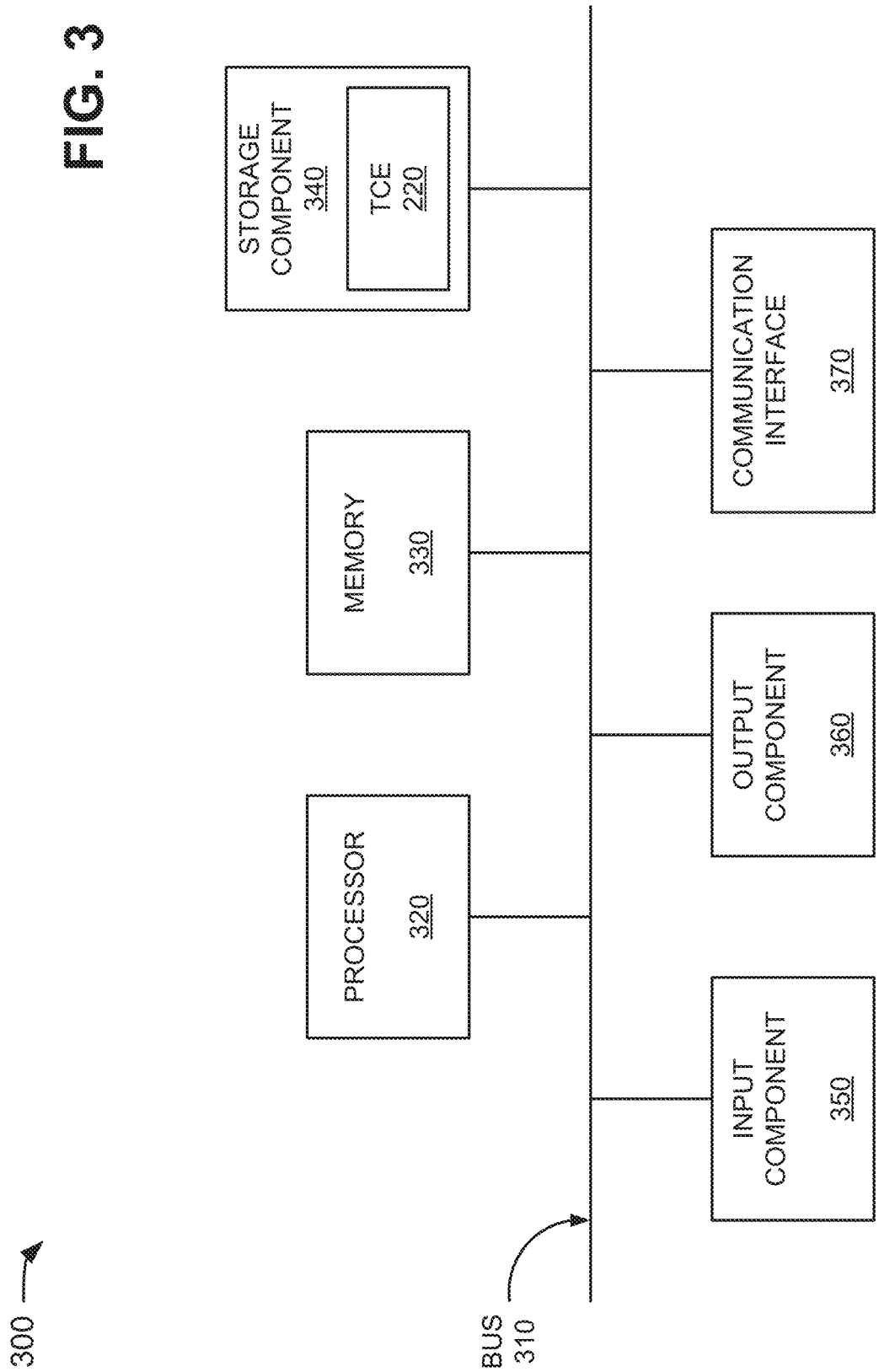

TEXTUAL CODE PROVIDED IN TEMPORAL AND CHANGE OPERATORS OF A TECHNICAL COMPUTING ENVIRONMENT

RELATED APPLICATION

This application claims priority under 35 U.S.C. §119 based on U.S. Provisional Patent Application No. 61/827,863, filed May 28, 2013, the disclosure of which is incorporated by reference herein in its entirety.

BRIEF DESCRIPTION OF THE DRAWINGS

FIGS. 1A and 1B are diagrams of an overview of an example implementation described herein;

FIG. 2 is a diagram of an example environment in which systems and/or methods described herein may be implemented;

FIG. 3 is a diagram of example components of one or more devices of FIG. 2;

DETAILED DESCRIPTION

The following detailed description of example implementations refers to the accompanying drawings. The same reference numbers in different drawings may identify the same or similar elements.

A technical computing environment (TCE) may include a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. The TCE may use an array, a vector, and/or a matrix as basic elements.

The TCE may provide a graphical environment for modeling and simulating combinatorial and sequential decision logic based on state machines and flow charts. The decision logic may enable users to combine graphical and tabular representations, including state transition diagrams, flow charts, state transition tables, and truth tables, to model how a system reacts to events, time-based conditions, and external input signals. The graphical environment may generate models, such as a textual model; a graphical model with one or more model elements (e.g., blocks), one or more input signals, and one or more output signals; a combination of a textual model and a graphical model; etc. The TCE may exist for creating computer-generated models, such as graphical behavioral models, that represent dynamic systems. A model may include a plurality of graphical objects, such as blocks or icons. A model may be executed to simulate the operation or behavior of the system being modeled. Executing the model may be referred to as simulating the model.

The TCE may provide a textual environment that includes a high-level language and an interactive environment for numerical computation, visualization, and programming. The textual environment may enable users to analyze data, develop algorithms, create models and applications, manipulate matrices, plot functions and data, implement algorithms, create user interfaces, and interface with programs written in other languages, including C, C++, Java, and Fortran. Unlike the graphical environment, which models how a system reacts to events and time-based conditions, the textual environment includes an imperative or declarative language with no concept of logical, model, physical, and/or simulation time and events.

Figure 1B:
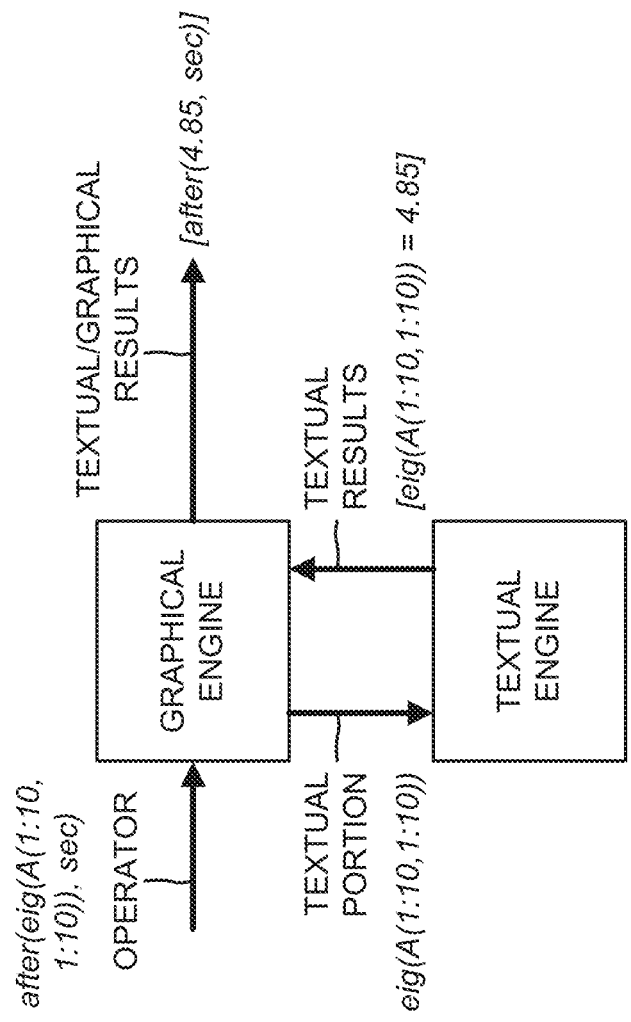

Conventional action languages for the graphical environment (e.g., Stateflow) consisted of statically-typed, scalar-based languages, such as, for example, C, C++, etc. FIGS. 1A and 1B are diagrams of an overview of an example implementation 100 described herein. In the example, a textual environment of the TCE may be provided in a graphical environment of the TCE. Time-based and event-based simulation may be introduced into the language of the textual environment, while maintaining the syntax and style of the language. The textual environment may have no concept of time or events without a user explicitly maintaining timers in the textual environment language. The graphical environment may provide several operators that refer to an elapsed simulation time or a change of events. The operators may include temporal or time-based operators (e.g., after, before, every, etc.), change or event-based operators (e.g., hasChanged, hasChangedFrom, hasChangedTo, etc.), etc. For example, an operator after(5, sec) may instruct the TCE to perform a specified act after five seconds (e.g., in simulation) have elapsed since another act occurred (e.g., a state was first entered).

As shown below in FIGS. 1A and 1B, the textual environment may be enhanced so that textual code understood by the textual environment may be utilized with operators, such as temporal operators, change operators, etc. With reference to FIG. 1A, a user may utilize a TCE of a computing device to create a state chart. The state chart may include state block A and state block B. State block A may include a representation of a calculation to be performed, and state block B may include a representation of a further calculation to be performed. As further shown in FIG. 1A, state block A may include textual code (e.g., en: u=1+t) understood by a textual environment of the TCE, and state block B may include textual code (e.g., en: v=u*5) portions of which may be understood by the textual environment of the TCE.

As further shown in FIG. 1A, a temporal operator (e.g., after(eig(A(1:10,1:10)), sec)) may be provided at a transition from state block A to state block B. The temporal operator may include textual code (e.g., eig(A(1:10,1:10))) understood by the textual environment of the TCE. The temporal operator may cause the state chart to transition from state block A to state block B when a certain amount (e.g., equal to an eigenvalue of A(1:10,1:10)) of seconds (sec) have elapsed. When the state chart is executed by the TCE, state block A may be entered and may execute the textual code (e.g., en: u=1+t) to generate results. State block B may be transitioned to when the conditions of the temporal operator are satisfied (e.g., after eig(A(1:10,1:10)) seconds have elapsed). State block B may execute the textual code (e.g., en: v=u*5), and may output results of the execution.

As shown in FIG. 1B, when executing the state chart, the TCE may execute the temporal operator (e.g., after(eig(A(1:10,1:10)), sec)) by providing the temporal operator to a graphical engine of the TCE. The graphical engine may divide the temporal operator into a textual portion and a graphical portion. The textual portion may include syntax that is understood by a textual engine of the textual environment. For example, the textual portion may include the syntax eig(A(1:10,1:10)) of the temporal operator. The graphical portion may include syntax that is understood by a graphical engine of the graphical environment. For example, the graphical portion may include the syntax after and sec of the temporal operator.

As further shown in FIG. 1B, the graphical engine may provide the textual portion to the textual engine, and the textual engine may process the textual portion to generate textual results. For example, the textual engine may calculate an eigenvalue of A(1:10,1:10) as being equal to 4.85. The eigenvalue of A(1:10,1:10) may be referred to as textual results. The textual engine may provide the graphical portion to the graphical engine, and the graphical engine may process the graphical portion to generate graphical results. For example, the graphical engine may determine whether the condition "after 4.85 seconds" is satisfied. The determination of whether the condition is satisfied may be referred to as graphical results. The graphical engine may combine the textual results with the graphical results to generate textual/graphical results. For example, the textual/graphical results may include whether the condition "after 4.85 seconds" is satisfied. The textual/graphical results may be provided to the state chart. If the condition "after 4.85 seconds" is satisfied, state block A may transition to state block B. If the condition "after 4.85 seconds" is not satisfied, state block A may not transition to state block B.

Such an arrangement may enable a user of a TCE to utilize the language of the textual environment with time-based and event-based operators provided by the graphical environment. This may provide the user with tools to create a variety of state charts and/or models based on the language of the textual environment.

FIG. 2 is a diagram of an example environment 200 in which systems and/or methods described herein may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include a device capable of receiving, generating, storing, processing, executing, and/or providing information in a manner described herein. For example, client device 210 may include a computing device, such as a desktop computer, a laptop computer, a tablet computer, a handheld computer, a server, a mobile phone (e.g., a smart phone, a radiotelephone, etc.), or a similar device. In some implementations, client device 210 may receive information from and/or transmit information to server device 230.

TCE 220 may be provided within a computer-readable medium of client device 210. Alternatively, or additionally, TCE 220 may be provided in another device (e.g., server device 230) that is accessible by client device 210. TCE 220 may include hardware or a combination of hardware and software that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In some implementations, TCE 220 may include a dynamically-typed programming language (e.g., the M language, a MATLAB® language, a MATLAB-compatible language, a MATLAB-like language, etc.) that can be used to express problems and/or solutions in mathematical notations. A model may be declarative in that the model may not allow the user to explicitly specify when a state of a machine that the model is executing on changes. In a declarative model, the user may not explicitly specify an order in which state changes in the model. In an imperative model, the user may explicitly specify when a particular state may change (e.g., relative to other state changes).

For example, TCE 220 may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In addition, TCE 220 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 220 may further provide mathematical functions and/or graphical tools (e.g., for creating plots, surfaces, images, volumetric representations, etc.). In some implementations, TCE 220 may provide these functions and/or tools using toolboxes (e.g., toolboxes for signal processing, image processing, data plotting, parallel processing, etc.). In some implementations, TCE 220 may provide these functions as block sets or in another way, such as via a library, etc.

TCE 220 may be implemented as a text-based environment (e.g., MATLAB software; Octave; Python; JavaScript; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dassault Systemes; etc.); and a graphically-based environment (e.g., Simulink® software, Stateflow® software, SimEvents® software, Simscape™ software, etc., by The MathWorks, Inc.; VisSim by Visual Solutions; LabView® by National Instruments; Dymola by Dassault Systemes; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; aspects of a Unified Modeling Language (UML) or SysML environment; etc.). In some implementations, TCE 220 may include a hybrid environment that includes one or more of the above-referenced text-based environments and one or more of the above-referenced graphically-based environments.

TCE 220 may include a programming language (e.g., the MATLAB language) that may be used to express problems and/or solutions in mathematical notations. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:

A='hello'
A=int32([1, 2])
A=[1.1, 2.2, 3.3].

Now suppose the program is executed, for example, in a TCE, such as TCE 220. During run-time, when the statement "A='hello'" is executed the data type of variable "A" may be a string data type. Later when the statement "A=int32([1, 2])" is executed the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

TCE 220 may provide mathematical routines and a high-level programming language suitable for non-professional programmers and may provide graphical tools that may be used for creating plots, surfaces, images, volumetric representations, or other representations. TCE 220 may provide these routines and/or tools using toolboxes (e.g., toolboxes for signal processing, image processing, data plotting, parallel processing, etc.). TCE 220 may also provide these routines in other ways, such as, for example, via a library, local or remote database (e.g., a database operating in a computing cloud), remote procedure calls (RPCs), and/or an application programming interface (API). TCE 220 may be configured to improve runtime performance when performing computing operations. For example, TCE 220 may include a just-in-time (JIT) compiler.

In some implementations, TCE 220 may provide a graphical environment for modeling and simulating combinatorial and sequential decision logic based on state machines and flow charts. The decision logic may enable users to combine graphical and tabular representations, including state transition diagrams, flow charts, state transition tables, and truth tables, to model how a system reacts to events, time-based conditions, and external input signals. The graphical environment may generate models, such as a textual model; a graphical model with one or more model elements (e.g., blocks), one or more input signals, and one or more output signals; a combination of a textual model and a graphical model; etc.

In some implementations, TCE 220 may provide a textual environment that includes a high-level language and an interactive environment for numerical computation, visualization, and programming. The textual environment may enable users to analyze data, develop algorithms, create models and applications, manipulate matrices, plot functions and data, implement algorithms, create user interfaces, and interface with programs written in other languages, including C, C++, Java, and Fortran. Unlike the graphical environment, which models how a system reacts to events and time-based conditions, the textual environment may include an assignment-based, imperative language with no concept of logical, model, physical, and/or simulation time and events.

In some implementations, and as further shown in FIG. 2, TCE 220 may include a parser 222, a transformer 224, a graphical engine 226, and a textual engine 228. Parser 222 may include a component that parses TCE code (e.g., a model or a chart) into a graphical portion and a textual portion. The graphical portion may include information associated with a graphical hierarchy, graphical symbols, etc. of the TCE code. The textual portion may include information associated with textual code of the TCE code that may be understood by textual engine 228. In some implementations, parser 222 may parse the textual portion into two or more portions (e.g., a time-based portion and an output portion), and may parse the graphical portion into two or more portions (e.g., a functional portion and a non-functional portion). In some implementations, parser 222 may parse TCE code into other types of portions.

Transformer 224 may include a component that receives the graphical portion of the TCE code that is not understood by graphical engine 226. For example, one or more graphical symbols may not be understood by graphical engine 226 and may be provided to transformer 224. Transformer 224 may transform the received graphical portion into a form that is understood by graphical engine 226.

Graphical engine 226 may receive the transformed graphical portion and the graphical portion that did not need to be transformed, and may process the received information. The processing of the received information may include generating graphical results, such as, for example, how a system reacts to events, time-based conditions, and external input signals. In some implementations, graphical engine 226 may include Simulink® software, Stateflow® software, Simscape™ software, and/or SimEvents® software.

Textual engine 228 may receive the textual portion, and may process the textual portion to generate textual results, such as, for example, data analysis results, matrix calculation results, array calculation results, etc. Graphical engine 226 may combine the graphical results with the textual results to generate combined results that may be understood by the graphical environment and the textual environment. In some implementations, textual engine 228 may include MATLAB software.

Server device 230 may include one or more devices capable of receiving, generating, storing, processing, executing, and/or providing information in a manner described herein. For example, server device 230 may include a computing device, such as a server, a desktop computer, a laptop computer, a tablet computer, a handheld computer, or a similar device. In some implementations, server device 230 may host TCE 220.

Network 240 may include one or more wired and/or wireless networks. For example, network 240 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

FIG. 3 is a diagram of example components of a device 300, which may correspond to client device 210 and/or server device 230. In some implementations, each of client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a path that permits communication among the components of device 300. Processor 320 may include a processor (e.g., a central processing unit, a graphics processing unit, an accelerated processing unit, etc.), a microprocessor, and/or any processing component (e.g., a field-programmable gate array (FPGA), an application-specific integrated circuit (ASIC), etc.) that interprets and/or executes instructions, and/or that is designed to implement a particular function. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes (LEDs), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform various operations described herein. Device 300 may perform these operations in response to processor 320 executing software instructions included in a computer-readable medium, such as memory 330 and/or storage component 340. A computer-readable medium may be defined as a non-transitory memory device. A memory device may include memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

Figure 4:
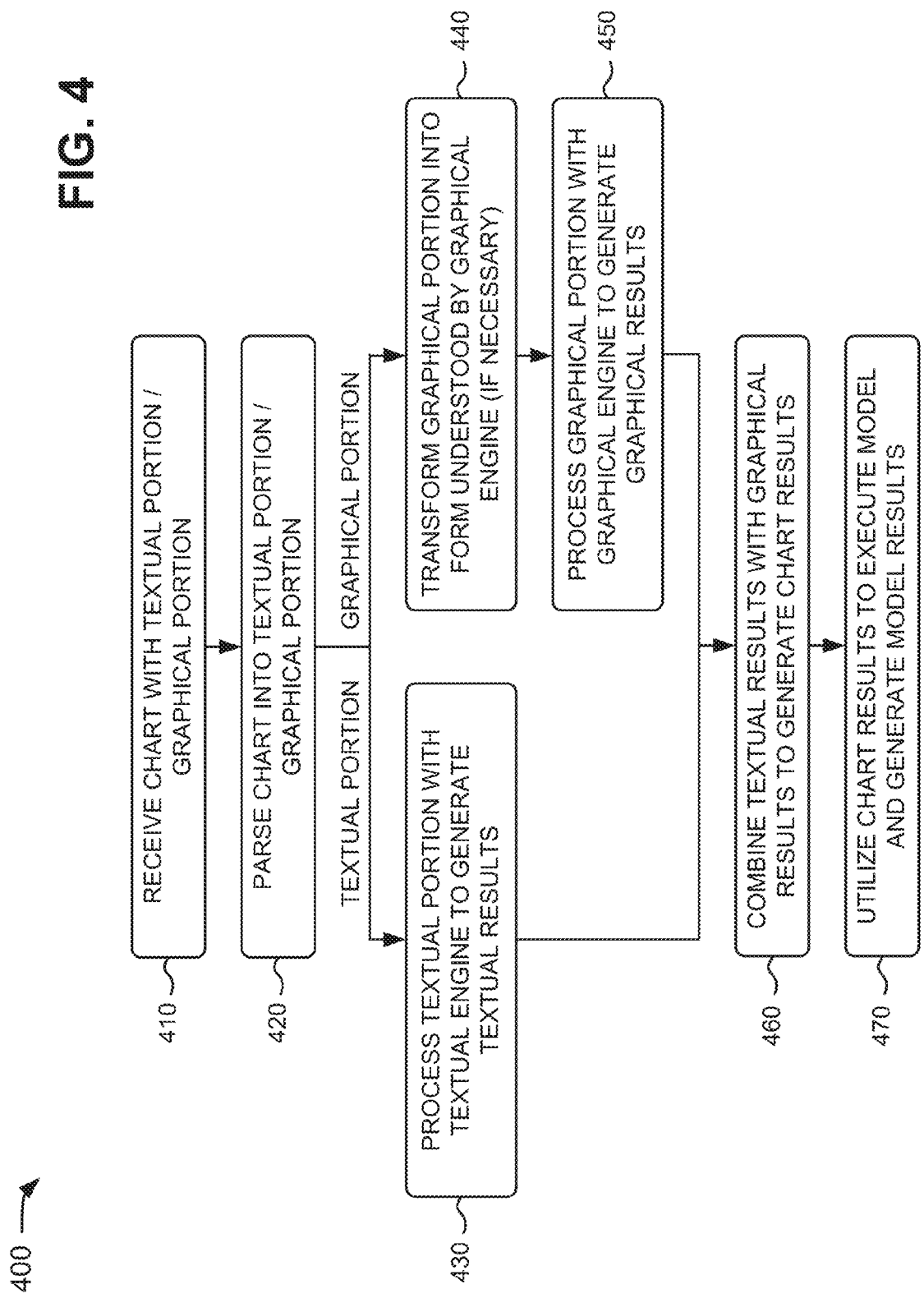
FIG. 4 is a flow chart of an example process for processing textual and graphical portions of a technical computing environment chart.

FIG. 4 is a flow chart of an example process 400 for processing textual and graphical portions of a technical computing environment chart. In some implementations, one or more process blocks of FIG. 4 may be performed by client device 210. In some implementations, one or more process blocks of FIG. 4 may be performed by another device or a group of devices separate from or including client device 210, such as server device 230.

As shown in FIG. 4, process 400 may include receiving a chart with a textual portion and a graphical portion (block 410). For example, TCE 220 may enable a user of client device 210 to create a model or to instruct client device 210 to receive the model from another source (e.g., server device 230, a CD-ROM, a flash memory, etc.). In some implementations, the model may include a chart with a graphical hierarchy of one or more chart elements (e.g., areas or regions associated with one or more states, referred to herein as "state blocks"), one or more input signals, and one or more output signals. For example, assume that a chart has state blocks A, B, and C, and that state block A includes state block B and a transition to state block C. An arrangement that includes a state block containing one or more state blocks and/or transitions to one or more state blocks may be referred to as a graphical hierarchy. Each of the chart elements may correspond to a status of a physical device, a subsystem, a model, etc. of a system being modeled (e.g., chart elements may behavioral so that a state may correspond to a status of a device, a subsystem, etc.).

In some implementations, the chart may include graphical symbols, transitions, and/or state transitions associated with the state blocks of the chart. The graphical symbols may include, for example, textual information that provides event-based conditions, time-based conditions, invariants, etc. to the state blocks, transitions, junctions, etc. In some implementations, one or more of the state blocks, transitions, and/or state transitions, may include textual code that may be understood and processed by textual engine 228 of TCE 220. The textual code may include, for example, one or more functions, matrices, data, etc. that may be understood and processed by textual engine 228.

In some implementations, TCE 220 may cause client device 210 to display a user interface so that the user may create and/or view the model and the chart. For example, the user may utilize the user interface to create the state blocks for the chart, and to connect the state blocks together. The user may associate the graphical symbols with the state blocks and/or other elements of the chart (e.g., transitions, state transitions, junctions, etc.), and may add the textual code in the one or more state blocks. The user may utilize the user interface to provide the chart within the model.

As further shown in FIG. 4, process 400 may include parsing the chart into a textual portion and a graphical portion (block 420). For example, parser 222 of TCE 220 may receive information associated with the chart, and may identify, based on the information, a portion of the chart that may be understood and processed by textual engine 228 (e.g., a textual portion) and a portion of the chart that may be understood and processed by graphical engine 226 (e.g., a graphical portion). In some implementations, parser 222 may have access to a data structure (e.g., a database) that stores syntax associated with the language of the textual environment of TCE 220 (e.g., and understood by textual engine 228). Parser 222 may compare the chart information with the syntax stored in the data structure, and may determine that particular portions of the chart information match the syntax. Parser 222 may designate the matching portions of the chart information as the textual portion. For example, parser 222 may designate functions, arrays, matrices, algorithms, etc. in the chart as the textual portion.

In some implementations, parser 222 may have access to a data structure (e.g., a database) that stores information associated with the graphical environment of TCE 220 (e.g., and understood by graphical engine 226). Parser 222 may compare the chart information with information stored in the data structure, and may determine that particular portions of the chart information match the information in the data structure. Parser 222 may designate the matching portions of the chart information as the graphical portion. For example, parser 222 may designate time-based conditions, event-based conditions, other conditions, hierarchy information, etc. as the graphical portion.

As further shown in FIG. 4, for the textual portion (block 420—TEXTUAL PORTION), process 400 may include processing the textual portion with the textual engine to generate textual results (block 430). For example, parser 222 may provide the textual portion of the chart to textual engine 228, and textual engine 228 may process the textual portion of the chart to generate textual results. In some implementations, textual engine 228 may execute the textual portion of the chart to generate the textual results. For example, assume that the textual portion of the chart includes a function for performing matrix calculations on data. In such an example, textual engine 228 may execute the function so that the matrix calculations are performed on the data. The matrix resulting from the calculations may be referred to as textual results. In another example, assume that the textual portion of the chart includes an algorithm for performing data analysis. In this example, textual engine 228 may execute the algorithm so that the data analysis is performed. The results of the data analysis may be referred to as textual results.

As further shown in FIG. 4, for the graphical portion (block 420—GRAPHICAL PORTION), process 400 may include transforming, if necessary, the graphical portion into a form understood by the graphical engine (block 440). For example, parser 222 may determine whether any of the graphical portion of the chart will not be understood by graphical engine 226. In some implementations, parser 222 may identify text in the graphical portion that may not be understood by graphical engine 226. For example, assume that the graphical portion includes the text before(abs(a*eig(b(1:10, 1:10))), sec), and that graphical engine 226 does not understand the text since graphical engine 226 needs to calculate a time to execute the text. In this example, parser 222 may provide the text to transformer 224, and transformer 224 may transform the text into a form understood by graphical engine 226. For example, transformer 224 may transform the text to utilize counters maintained by the graphical environment (e.g., Simulink) so that a time (e.g., one second, two seconds, etc.) may be calculated by graphical engine 226. In some implementations, transformer 224 may provide the transformed text to graphical engine 226 for processing. In some implementations, the text provided in the graphical portion may include textual operations (e.g., after(abs(a*eig(b(1:10, 1:10))), sec)) that are understood by the textual environment, such as, for example, TCE operations.

In some implementations, parser 222 may provide the remaining graphical portion (e.g., which may be understood by graphical engine 226) directly to graphical engine 226. In some implementations, parser 222 may determine that all of the graphical portion may be understood by graphical engine 226. In such a situation, parser 222 may provide the entire graphical portion to graphical engine 226 and transformer 224 may not be utilized.

As further shown in FIG. 4, for the graphical portion (block 420—GRAPHICAL PORTION), process 400 may include processing the graphical portion with the graphical engine to generate graphical results (block 450). For example, parser 222 may provide, to graphical engine 226, the graphical portion of the chart that is understood by graphical engine 226. Transformer 224 may provide, to graphical engine 226, any of the graphical portion that has been transformed into a form that is understood by graphical engine 226. Graphical engine 226 may process the graphical portion of the chart to generate graphical results. In some implementations, graphical engine 226 may execute the graphical portion of the chart to generate the graphical results. For example, assume that the graphical portion of the chart includes instructions to combine graphical and tabular representations. In such an example, graphical engine 226 may execute the instructions so that the graphical and tabular representations are combined. The resulting combination may be referred to as graphical results. In another example, assume that the graphical portion of the chart includes an event-based condition (e.g., transition to state block A when a function is calculated). In this example, graphical engine 226 may execute the event-based condition so that state block A is transitioned to. The results of the execution of the event-based condition may be referred to as graphical results. In some implementations, graphical engine 226 may execute textual information.

As further shown in FIG. 4, process 400 may include combining the textual results with the graphical results to generate chart results (block 460). For example, TCE 220 may combine the textual results, generated by textual engine 228, with the graphical results generated by graphical engine 226 to generate chart results. In some implementations, the chart results may include results associated with execution of the chart. For example, assume that the textual results include a calculation of a function bar and that the graphical results include utilizing the calculation when a state block B is transitioned to. In such an example, the chart results may include transitioning to state block B and utilizing the calculation of the function bar. In another example, assume that the textual results include performing a matrix calculation and that the graphical results include computing the time period based on the array-based computations. In such an example, the chart results may include determining when the time period has expired and utilizing the matrix calculation after the time period has expired and/or utilizing the matrix calculation to determine the time period. In some implementations, the chart may model reactive systems via state machines and flow charts within a model. In some implementations, the chart may use a variant of a finite-state machine notation, which may enable representation of hierarchy, parallelism, event broadcast, and/or history within the chart. In some implementations, the chart may provide state transition tables and/or truth tables. In some implementations, the chart may represent discrete modes of a system by a state, may control how a system responds to faults and failures within the system, and may schedule when specific tasks occur (e.g., either within the chart or within an overall model).

As further shown in FIG. 4, process 400 may include utilizing the chart results to execute the model and generate model results (block 470). For example, TCE 220 may utilize the chart results in the model (e.g., during execution of the model) to generate model results. In some implementations, the model results may include results associated with execution of the model based on the chart results. For example, assume that the chart results include transitioning to state block B and utilizing a calculation of a function bar. After state block B is transitioned to and the function bar is calculated, TCE 220 may utilize the function calculation in the model to generate the model results. In another example, assume that the chart results include determining when a time period has expired and utilizing the computations to determine the time period. After the matrix calculation is performed, TCE 220 may utilize the matrix calculation in the model to generate the model results and/or to determine the time period.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
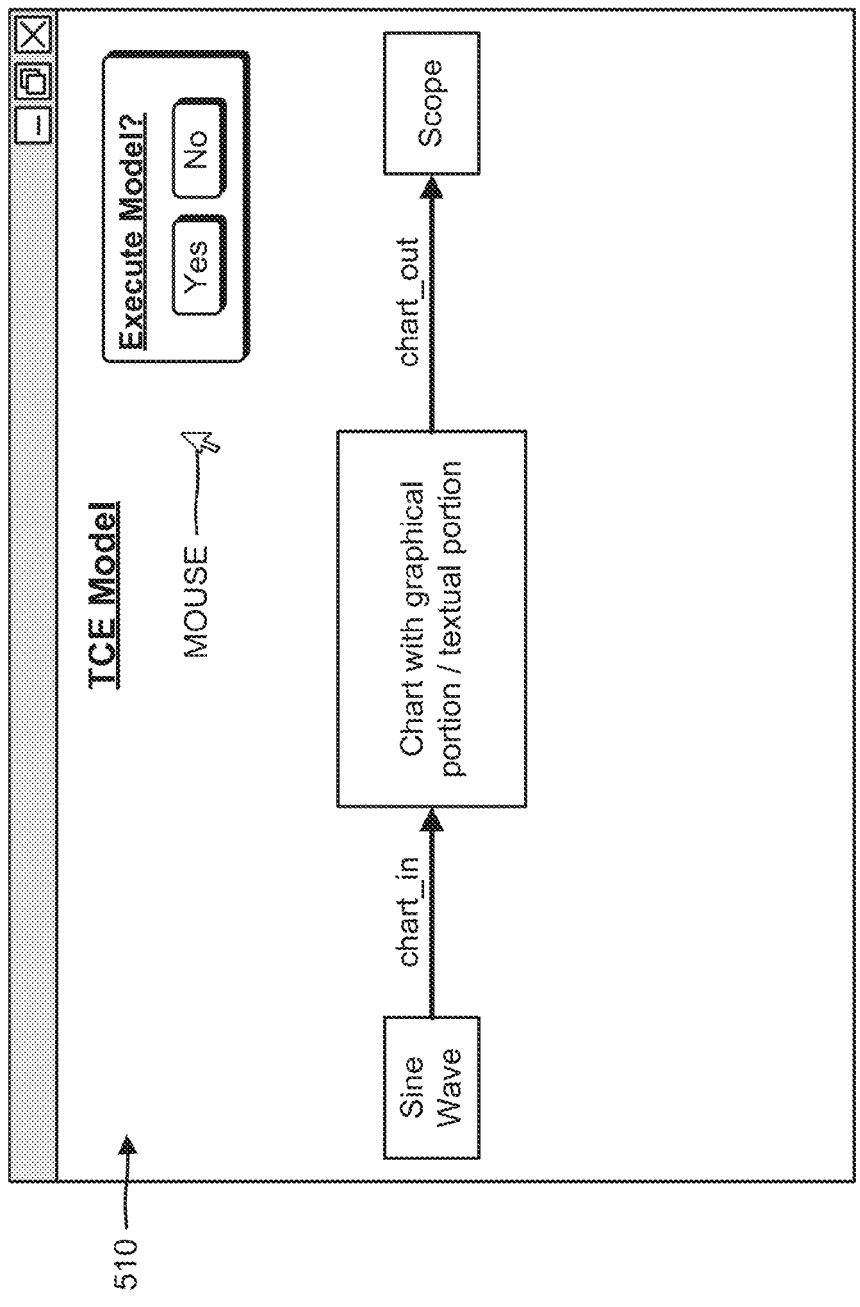
FIGS. 5A-5E are diagrams of an example relating to the example process shown in FIG. 4.

FIGS. 5A-5E are diagrams of an example 500 relating to example process 400 shown in FIG. 4. In example 500, assume that a user of client device 210 utilizes TCE 220 to create a model or to import the model into TCE 220. As shown in FIG. 5A, TCE 220 may cause client device 210 to display the model in a user interface 510. The model may include a sine wave block, a chart block, and a scope block.

The sine wave block may include a representation of a sine wave that is to be displayed by the scope block. In example 500, assume that the sine wave block provides a chart_in signal (e.g., a sine wave signal) to the chart block. The chart block may include a representation of a chart that processes the sine wave signal so that it may be understood by the scope block. The chart block may include a graphical portion and a textual portion. The chart block may receive the chart_in signal, and may process the chart_in signal to produce a chart_out signal (e.g., a voltage/time signal to be displayed by the scope block). The chart block may provide the chart_out signal to the scope block. The scope block may include a representation of an oscilloscope that displays constantly varying signal voltages as a function of time. The scope block may receive the chart_out signal, and may display the signal (e.g., a voltage/time signal). In some implementations, the chart block may include a chart (FIG. 5B) that may be executed based on different execution semantics provided by a user and/or inferred from the model. The execution semantics may include dynamic notions associated with continuous time for example, computing the time derivatives of a dynamic system based on matrix calculations, etc. In some implementations, the chart may be provided in an environment that includes multiple domains.

As further shown in FIG. 5A, TCE 220 may instruct client device 210 to display an option to execute the model. For example, user interface 510 may display a window or some other display mechanism that requests whether the user wants to execute the model. If the user elects to execute the model (e.g., via selection of a "Yes" button with a mouse or other selection mechanism), TCE 220 may execute the model. In some implementations, the user may select a "Play" button with the mouse, and TCE 220 may execute the model. In order to execute the model, assume that TCE 220 needs to execute the chart block, as shown in a user interface 520 of FIG. 5B. In some implementations, the model may include computational semantics associated with graphical and textual elements, and may include computational semantics associated with various blocks in the model. In some implementations, TCE 220 may debug the model before or during execution of the model or generation of code.

As shown in user interface 520, the chart may include a graphical hierarchy of state blocks A, B, C, and D. The graphical hierarchy may include the arrangement of the state blocks in the chart. For example, state block A may be transitioned to first, state block B may be transitioned to second, state block C may be transitioned to third, and state block D may be transitioned to last. The state blocks may include state information provided by graphical symbols. For example, state block A may include the graphical symbols en: a_data=3 and du: u_buffer=[chart_in; u_buffer(1:end-1)] (e.g., which may be parsed by graphical engine 226 into a portion "du" that may be understood by graphical engine 226 and another portion "u_buffer=[chart_in; u_buffer(1:end-1)]" that may be understood by textual engine 228); state block B may include the graphical symbols en: chart_out=a_data; state block C may include the graphical symbols en: foo( ) and state block D may include the graphical symbols en: chart_out=data. Some or all of the graphical hierarchy, state blocks A, B, C, and D, and the graphical symbols may be understood by graphical engine 226. State block A may also include textual code (e.g., a function foo) that may be understood by textual engine 228. In some implementations, the textual code may include text for a function (e.g., foo, bar, etc.), text for a matrix (e.g., C=[1, 2, 3]), array-based text, dynamically-typed text, dynamic assignments, script or function name spaces, etc. (e.g., text that ignores certain output arguments, a function with logic that involves a caller's number of output arguments, fixed point quantities that use integer containers to specify approximate floating point values). In some implementations, graphical engine 226 may execute graphical code and textual code (e.g., C code), but may not execute dynamically-typed and/or array-based code. In some implementations, textual engine 228 may execute the dynamically-typed, array-based code.

Figure 5B:
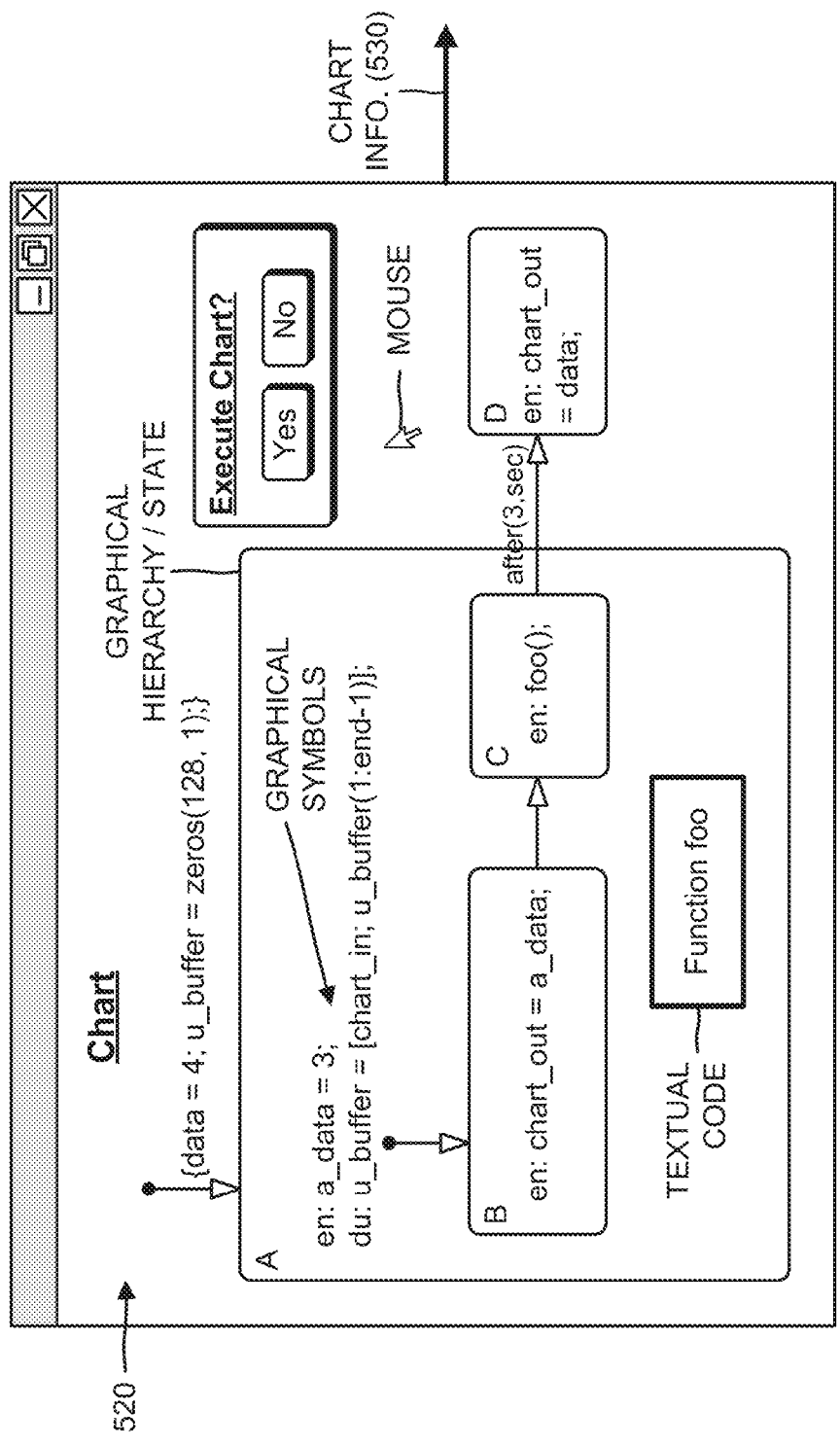

As further shown in FIG. 5B, when the chart wakes up, the default transitions of the chart may be executed. For example, an action in a default transition (e.g., {data=4; u_buffer=zeros(128, 1);}) may be executed, and state block A may be marked as active. Graphical symbols of state block A (e.g., an entry action en: a_data=3) may be executed, and default transitions inside state block A may be executed to establish an active child of state block A (e.g., mark state block B as active). Graphical symbols of state block B (e.g., an entry action en: chart_out=a_data) may be executed, and the chart execution may be complete (e.g., the chart may go to sleep) since no child states remain. When the chart sleeps, state blocks A and B may be active. A next time the chart wakes up, graphical symbols of state block A (e.g., the during action du: u_buffer=[chart_in; u_buffer(1:end-1)]) may be executed since there are no direct outer transitions of state block A. Outer transitions of state block B may be checked, and, since there is no condition, the transition to state block C may be assumed to be true. Therefore, the chart may transition from state block B to state block C. State block C may become active and state block A may remain active. The chart may keep waking up according to solver settings and/or system dynamics, and may wake up many times or a few times. Every time the chart wakes up, the outer transitions of all active state blocks may be checked, for example, in a top-down manner. If an outer transition of a particular state block is not true, a during action of the particular state block may be executed. Otherwise, a transition may occur to a next state block. This may result in one or more executions of the during action of state block A (e.g., du: u_buffer=[chart_in; u_buffer(1:end-1)]).

At some point, the chart may wake up, with a condition specified in an outer transition of state block C (e.g., after(3, sec)) being true, after state block C is first entered. When this condition is true, a transition from state block C may occur. State block C may be marked as inactive when state block C is exited. State block A may be marked as inactive since the outer transition of state block C (e.g., after(3, sec)) leaves a graphical boundary of state block A. State block C may transition to state block D, and state block D may be marked as active. At this time, only state block D may be active in the chart. Graphical symbols of state block D (e.g., an entry action en: chart_out=data) may be executed at this time.

As further shown in FIG. 5B, TCE 220 may instruct client device 210 to display an option to execute the chart or may automatically execute the chart when the model is executed. For example, user interface 520 may display a window or some other display mechanism that requests whether the user wants to execute the chart. If the user elects to execute the chart (e.g., via selection of a "Yes" button with a mouse or other selection mechanism), TCE 220 may execute the chart to generate chart information 530, as further shown in FIG. 5B. Chart information 530 may include information associated with the graphical hierarchy, state blocks A, B, C, and D, the graphical symbols, the textual code, and/or execution of the graphical hierarchy, state blocks A, B, C, and D, the graphical symbols, and/or the textual code. In some implementations, the chart may be executed based on conditions in a model (e.g., a time-based block diagram model). For example, if a temperature in a model of an HVAC system exceeds a certain value (e.g., at a particular time), a status of a heater device may change from on to off.

In some implementations, TCE 220 may begin searching at a lowest level of the graphical hierarchy for data and/or a function and move up the graphical hierarchy level by level until the data/function is found. In some implementations, TCE 220 may include a global or logical workspace that may be searched first or last, for example, for data and/or a function. In some implementations, TCE 220 may execute the chart by executing one or more transitions, by executing in microsteps, by executing all events and actions at a hierarchical level, etc. Each microstep may result in a set of transitions that result in a stable state configuration (e.g., the result of one state chart execution). A state machine may continue to execute microsteps until no state transitions are possible from a current state configuration.

Figure 5C:
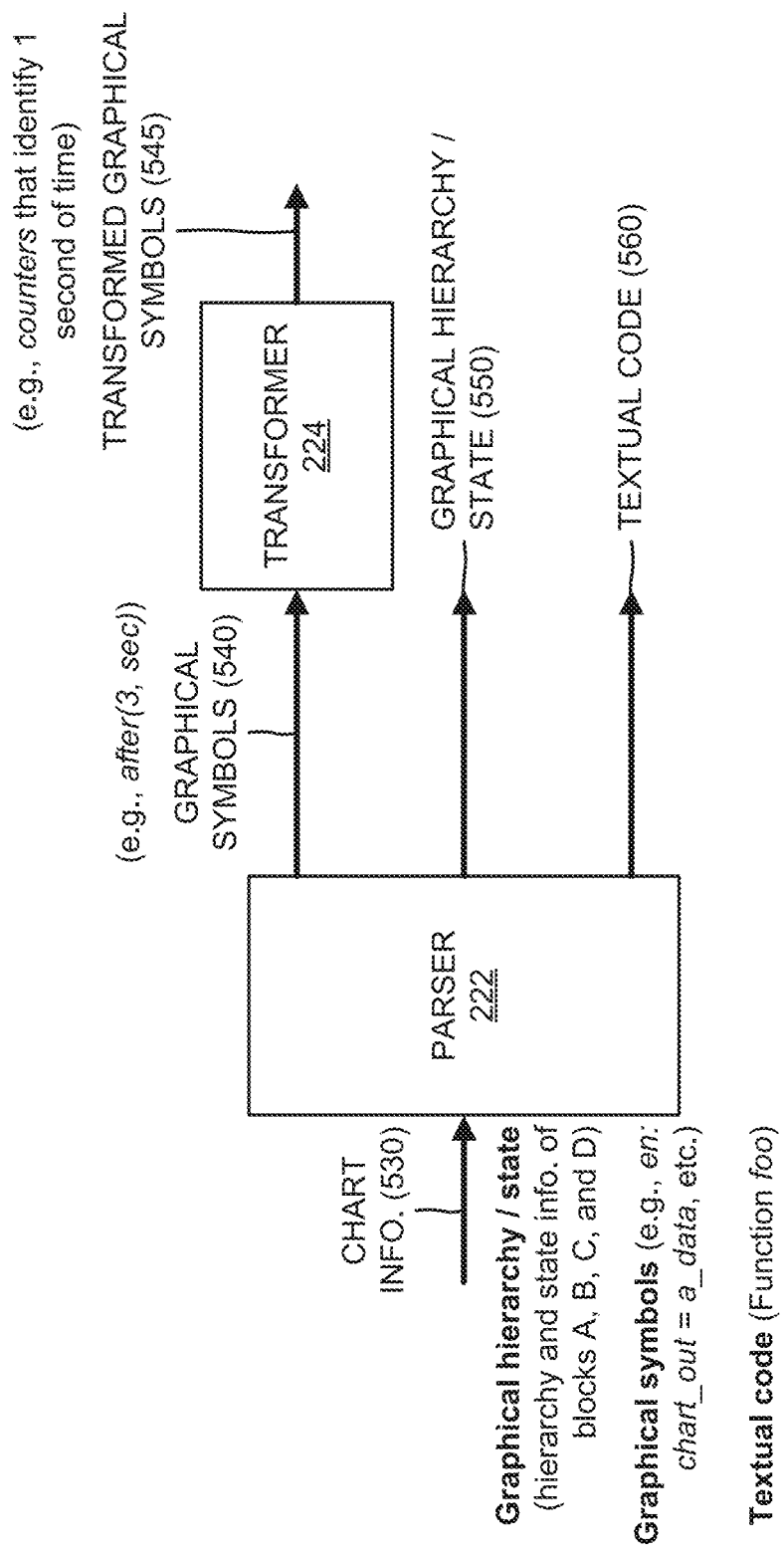

As shown in FIG. 5C, assume that TCE 220 provides chart information 530 to parser 222. For example, TCE 220 may provide, to parser 222, the information associated with the graphical hierarchy and the state of the chart (e.g., the hierarchy and active state information of state blocks A, B, C, and D); the information associated with the graphical symbols (e.g., chart_out=data, after(3, sec), etc.); the information associated with the textual code (e.g., the function foo); and/or the execution of the graphical hierarchy, state blocks A, B, C, and D, the graphical symbols, and/or the textual code. Parser 222 may parse chart information 530 into information 540 associated with graphical symbols that are not understood by graphical engine 226; information 550 associated with the graphical hierarchy and state blocks A, B, C, and D; and information 560 associated with the textual code.

Information 540 may not be generated if all of the graphical symbols, in chart information 530, are understood by graphical engine 226. In such a situation, parser 222 may provide information 540 associated with the graphical symbols directly to graphical engine 226. In one example, information 540 may include the text after(3, sec) or after (abs(a*eig(b(1:10, 1:10))), sec), which may not be understood by graphical engine 226 since graphical engine 226 does not understand TCE language syntax (e.g., abs(a*eig (b))). In this example, parser 222 may provide the text to transformer 224, and transformer 224 may transform the text into a form understood by graphical engine 226 (e.g., transformed graphical symbols 545, as shown in FIG. 5C). For example, transformer 224 may transform the text to utilize counters maintained by the graphical environment (e.g., Simulink) so that a time (e.g., one second, two seconds, etc.) may be calculated by graphical engine 226. Information 550 associated with the graphical hierarchy and state blocks A, B, C, and D may include, for example, the hierarchy and state information of state blocks A, B, C, and D, information identifying that state A is a parent state for state B, etc. Information 560 associated with the textual code may include, for example, information associated with the function foo.

Figure 5D:
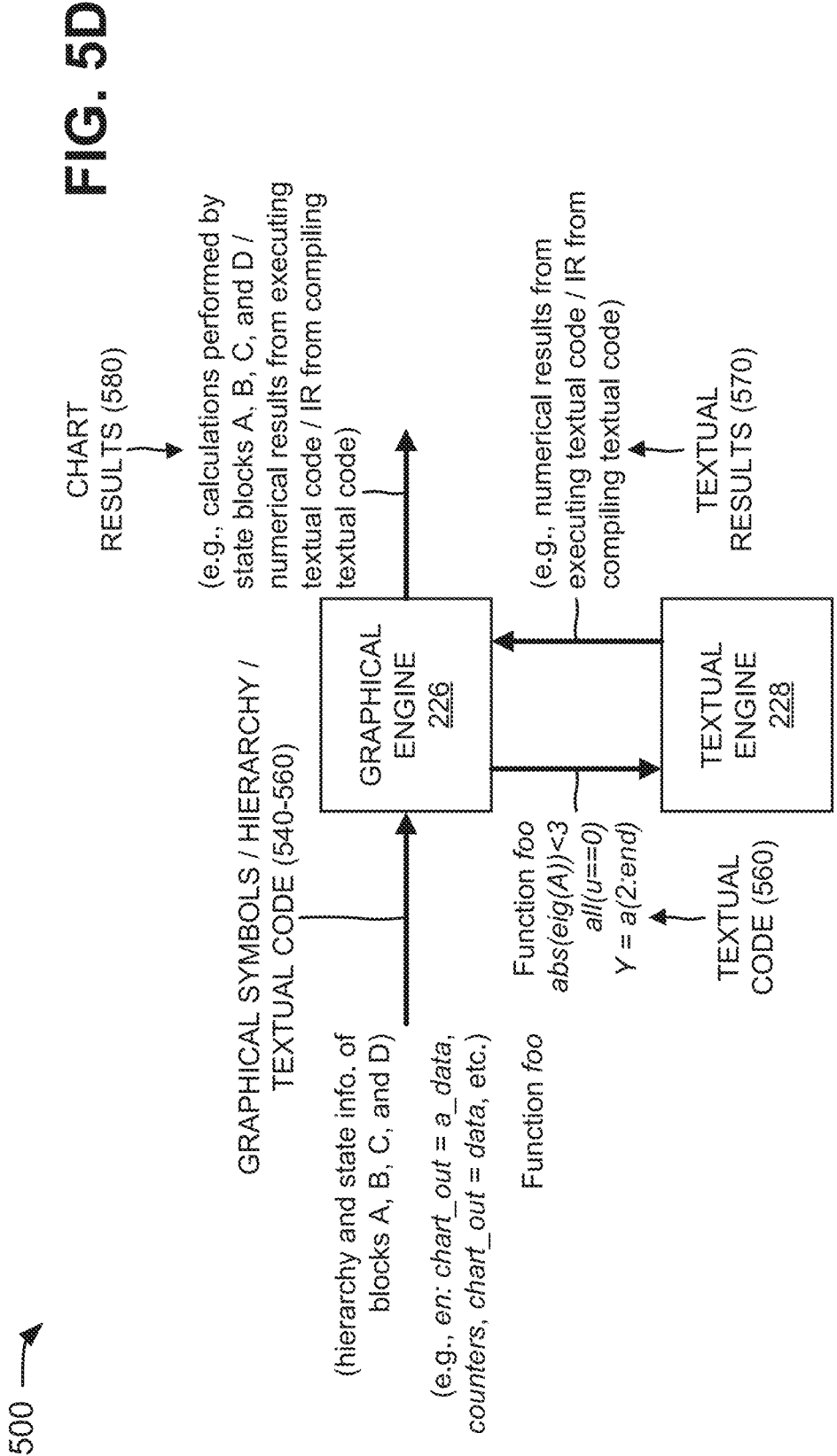

As shown in FIG. 5D, graphical engine 226 may receive information 540 associated with graphical symbols (e.g., chart_out=a_data), transformed graphical symbols 545 (e.g., counters), information 550 associated with the graphical hierarchy and state (e.g., the hierarchy and state information of state blocks A, B, C, and D), and information 560 associated with the textual code (e.g., the functions foo, abs(eig(A))<3, all(u==0), and Y=a(2:end)). In some implementations, information 560 associated with the textual code may include zero crossing detection and location information, for example, to determine when discrete events occur.

Graphical engine 226 may provide information 560 associated with textual code to textual engine 228. Textual engine 228 may process information 560 to generate textual results 570. In example 500, assume that textual results 570 include numerical results from executing the textual code (e.g., the function foo) and/or an intermediate representation (IR) from compiling the textual code. Textual engine 228 may provide textual results 570 to graphical engine 226. Graphical engine 226 may process information 540, transformed graphical symbols 545, information 550, and textual results 570 to generate chart results 580. In example 500, assume that chart results 580 include the calculations performed by one or more of state blocks A, B, C, and/or D, numerical results from executing the textual code (e.g., the function foo), and/or an intermediate representation (IR) from compiling the textual code.

Figure 5E:
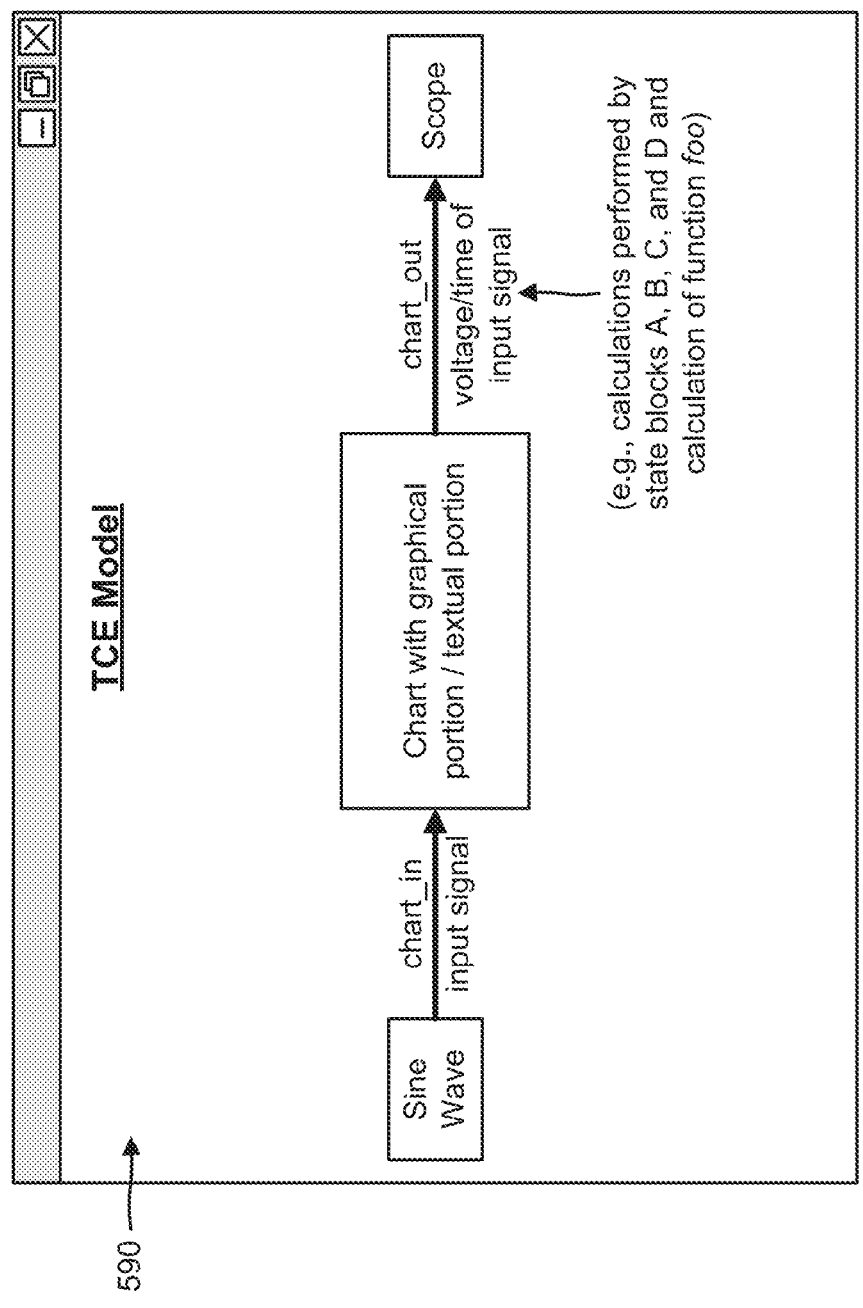

After one or more portions of the chart are executed and chart results 580 are generated, TCE 220 may utilize chart results 580 to execute the model. For example, as described above in connection with FIG. 5B, the chart may wake up and execute one or more of state blocks A, B, C, and D. In some implementations, the chart may execute one or more portions of a model and/or the model may execute one or more portions of the chart. As shown in FIG. 5E, TCE 220 may cause client device 210 to display a user interface 590 that includes the executed model. As shown in user interface 590, the chart block may receive an input signal (e.g., a sine wave) from the sine wave block, and may output a voltage/time signal, based on the input signal, to the scope block. As further shown, the voltage/time signal may correspond to the calculations performed by state blocks A, B, C, and/or D and/or the calculation of the function foo.

As indicated above, FIGS. 5A-5E are provided merely as an example. Other examples are possible and may differ from what was described with regard to FIGS. 5A-5E.

Figure 6:
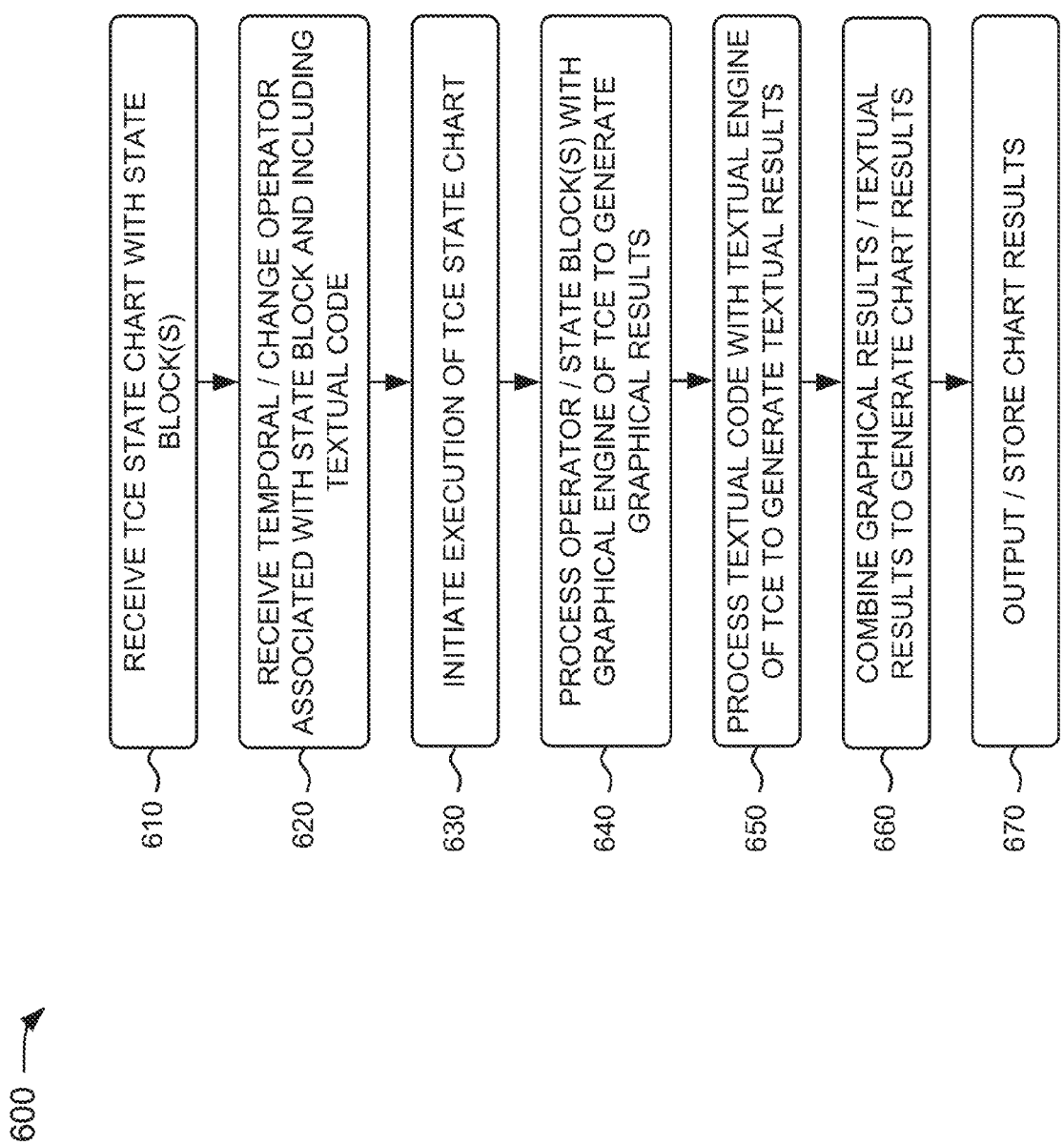
FIG. 6 is a flow chart of an example process for processing textual code in a temporal operator or a change operator in a technical computing environment.

FIG. 6 is a flow chart of an example process 600 for processing textual code in a temporal operator or a change operator in a technical computing environment. In some implementations, one or more process blocks of FIG. 6 may be performed by client device 210. In some implementations, one or more process blocks of FIG. 6 may be performed by another device or a group of devices separate from or including client device 210, such as server device 230.

As shown in FIG. 6, process 600 may include receiving a TCE state chart with one or more state blocks (block 610). For example, TCE 220 may cause client device 210 to display a user interface to a user of client device 210. The user interface may include mechanisms (e.g., menus, buttons, icons, libraries, etc.) that enable the user to create a state chart for TCE 220. In some implementations, the user may wish to create a state chart with one or more chart elements (e.g., state blocks), one or more input signals, and one or more output signals. Each of the state chart elements may be associated with a state of a physical device, a subsystem, another model, etc. of a system being modeled.

In some implementations, the user of client device 210 may utilize TCE 220 to import the state chart into TCE 220 from memory (e.g., memory 330 or storage component 340) of client device 210. In some implementations, the user of client device 210 may utilize TCE 220 to import the state chart into TCE 220 from another source, such as, for example, server device 230 or an external memory device (e.g., a CD-ROM, a flash memory, etc.).

As further shown in FIG. 6, process 600 may include receiving a temporal/change operator, associated with a state block and including textual code (block 620). For example, the user may utilize the user interface to provide a state block in the state chart, and to associate an operator with the state block. In some implementations, the state block and the operator may be included in the state chart if the state chart is imported into TCE 220. In some implementations, the operator may include textual code that may be understood and processed by textual engine 228 of TCE 220. The textual code may include, for example, one or more functions, matrices, arrays, data, etc. that may be understood and processed by textual engine 228.

In some implementations, the operator may include a temporal or time-based operator. A temporal operator may utilize a sample rate of a state chart, an expression typed by the user, etc. For example, assume that a sample rate of the state chart is 5 milliseconds (msec) and that the user inputs an expression after(PAR,msec). TCE 220 may automatically transform the expression into 5*counter>=PAR to avoid floating point division and to provide efficient integer multiplication. The temporal operator may include keywords (e.g., sec, msec, usec, etc.) that let the user specify units of a time interval for the temporal operator. In some implementations, the temporal operator may include syntax, such as, for example, after, before, every, etc. For example, a temporal operator after(10, sec) may return true after ten seconds have elapsed since a current active state is entered. In another example, if a temporal operator after(3, sec) is provided at a transition between state blocks A and B, the temporal operator may cause a transition from state block A to state block B three seconds after state block A is entered.

In some implementations, the operator may include a change or event-based operator that may cause TCE 220 to automatically check whether a variable value has changed since an event (e.g., a last time a state was activated). In some implementations, the change operator may include syntax, such as, for example, hasChanged, hasChangedFrom, hasChangedTo, etc. For example, the hasChanged operator may cause TCE 220 to check whether a variable changes value from a beginning of a last time step (e.g., a time a state was activated) to a beginning of a current time step. The hasChangedFrom operator may cause TCE 220 to check whether a variable changes from a specified value, at a beginning of a last time step, to a different value, at a beginning of a current time step. The hasChangedTo operator may cause TCE 220 to check whether a variable changes to a specified value, at a beginning of a current time step, from a different value, at a beginning of a last time step.

In some implementations, the change operator may cause TCE 220 to return a "1" if the value changes or a "0" if the value does not change. For example, hasChanged(u) may cause TCE 220 to return a "1" if u changes value since a last time step. If u is a matrix, hasChanged(u) may cause TCE 220 to return a "1" if any element of u changes value since the last time step. In another example, hasChangedFrom(u, v) may cause TCE 220 to return a "1" if u changes from a value specified by v since a last time step. In another example, hasChangedTo(u, v) may cause TCE 220 to return a "1" if u changes to a value specified by v in a current time step. In some implementations, if two floating point variables are compared, TCE 220 may account for a small tolerance (e.g., automatically determined by TCE 220 or provided by the user) to consider the variables equivalent (e.g., within the tolerance). In some implementations, the operator may include other types of operators.

As further shown in FIG. 6, process 600 may include initiating execution of the TCE state chart (block 630). For example, the user may instruct TCE 220 to execute the state chart, and TCE 220 may initiate execution of the state chart based on the user's instructions. In some implementations, TCE 220 may initiate execution of the state chart when the user inputs a command or selects a display mechanism (e.g., a button, a menu item, etc.) that instructs TCE 220 to execute the state chart. For example, TCE 220 may cause client device 210 to display an Execution button in the user interface. When the user selects the Execution button, the selection may cause TCE 220 to initiate execution of the state chart. In another example, TCE 220 may cause client device 210 to display a command window in the user interface. The user may enter a command (e.g., "execute state chart") in the command window, and TCE 220 may initiate execution of the state chart based on the entered command.

As further shown in FIG. 6, process 600 may include processing the operator and the state block(s) with a graphical engine of the TCE to generate graphical results (block 640). For example, parser 222 of TCE 220 may receive chart information associated with the state chart. In some implementations, the chart information may include information associated with state blocks, temporal operators, change operators, textual code, etc. provided in the state chart. TCE 220 may identify, based on the chart information, a portion of the state chart that may be understood and processed by textual engine 228 (e.g., a textual portion) and a portion of the state chart that may be understood and processed by graphical engine 226 (e.g., a graphical portion). In some implementations, graphical engine 226 may have access to a data structure (e.g., a database) that stores syntax associated with the language of the textual environment of TCE 220 (e.g., and understood by textual engine 228). Graphical engine 226 may compare the chart information with the syntax stored in the data structure, and may determine that particular portions of the chart information match the syntax. Graphical engine 226 may designate the matching portions of the chart information as the textual portion. For example, graphical engine 226 may designate the textual code provided in the operator as the textual portion.

In some implementations, graphical engine 226 may have access to a data structure (e.g., a database) that stores information associated with the graphical environment of TCE 220 (e.g., and understood by graphical engine 226). Graphical engine 226 may compare the chart information with information stored in the data structure, and may determine that particular portions of the chart information match the information in the data structure. Graphical engine 226 may designate the matching portions of the chart information as the graphical portion. For example, graphical engine 226 may designate state information associated with the state block of the state chart, the operator, etc. as the graphical portion.

Graphical engine 226 may process the graphical portion of the state chart to generate graphical results. In some implementations, graphical engine 226 may execute the graphical portion of the state chart to generate the graphical results. For example, graphical engine 226 may execute any functions, expressions, etc. provided in the state blocks of the state chart, and may execute the operator. If the operator is a temporal operator (e.g., after(5, sec)), graphical engine 226 may execute the temporal operator to determine whether five seconds have elapsed since a state has been entered. In this example, the results of the execution of the temporal operator may be referred as graphical results. If the operator is a change operator (e.g., hasChanged(u)), graphical engine 226 may execute the change operator to determine whether u changes value since a last time step. In this example, the results of the execution of the change operator may be referred as graphical results.

As further shown in FIG. 6, process 600 may include processing the textual code with a textual engine of the TCE to generate textual results (block 650). For example, graphical engine 226 may provide the textual portion of the state chart to textual engine 228, and textual engine 228 may process the textual portion of the state chart to generate textual results. In some implementations, textual engine 228 may execute the textual portion of the state chart to generate the textual results. For example, assume that the textual code of an operator in the state chart includes a calculation (e.g., eig(Z)) for performing calculations on a matrix Z. In such an example, textual engine 228 may execute the calculation so that the matrix calculations are performed on matrix Z. The results from the calculations may be a matrix and may be referred to as textual results. In another example, assume that the textual code of an operator of the state chart includes a comparison (e.g., average(y)>10). In this example, textual engine 228 may execute the calculation average(y) so that the average is calculated. The results of the execution and of the comparison may be referred to as textual results.

As further shown in FIG. 6, process 600 may include combining the graphical results and the textual results to generate chart results (block 660). For example, TCE 220 may combine the graphical results generated by graphical engine 226 and the textual results generated by textual engine 228 to create chart results. In some implementations, the chart results may include results associated with execution of the state chart. For example, assume that the state chart includes two state blocks (e.g., state block A and state block B), that state block A calculates a function (e.g., x=x+2), and that state block B calculates another function (e.g., y=x*sin(9.67)). Further, assume that a transition from state block A to state block B includes a change operator (e.g., hasChangedTo(x, 10)). In this example, the textual results may include the calculations of variables x and y, and the graphical results may include entering state block A and transitioning to state block B when the change operator is satisfied (e.g., when variable x has changed to a value of ten). Thus, the chart results may include entering state block A, calculating variable x, transitioning to state block B when a value of variable x is equal to ten, and calculating variable y.

In some implementations textual engine 228 may combine the textual results with the graphical results to generate the chart results. In some implementations, graphical engine 226 may combine the textual results with the graphical results to generate the chart results.

As further shown in FIG. 6, process 600 may include outputting or storing the chart results (block 670). For example, TCE 220 may cause client device 210 to provide the chart results for display to the user. In some implementations, TCE 220 may cause client device 210 to store the chart results in memory (e.g., memory 330, storage component 340, etc.) associated with client device 210 and/or server device 230. In some implementations, TCE 220 generate output code based on the chart results, and may cause client device 210 to embed the output code in a physical device (e.g., a robot, manufacturing equipment, etc.).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
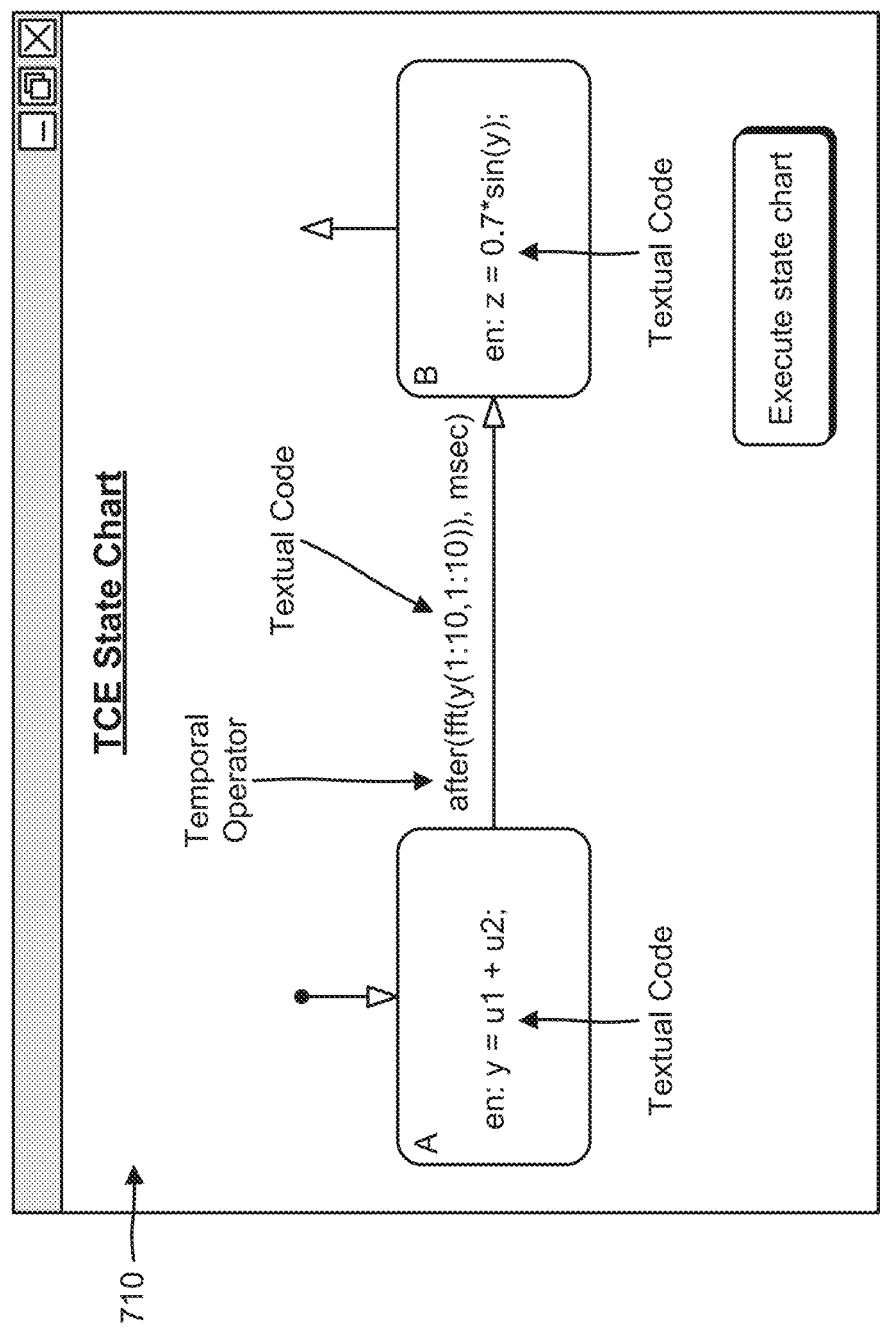
FIGS. 7A-7D are diagrams of an example relating to the example process shown in FIG. 6.

FIGS. 7A-7D are diagrams of an example 700 relating to example process 600 shown in FIG. 6. In example 700, assume that a user of client device 210 utilizes TCE 220 to create a state chart or to import the state chart into TCE 220. As shown in FIG. 7A, TCE 220 may cause client device 210 to display the state chart in a user interface 710 as the user creates the state chart or after the user imports the state chart. The state chart may include a first state block (e.g., state block A) and a second state block (e.g., state block B). State block A may include a representation of a calculation to be performed, and state block B may include a representation of another calculation to be performed. As further shown in FIG. 7A, state block A may include textual code (e.g., en: y=u1+u2) understood by the textual environment of TCE 220, and state block B may include textual code (e.g., en: z=0.7*sin(y)) understood by graphical engine 226 and/or textual engine 228.

As further shown in FIG. 7A, a temporal operator (e.g., after(fft(y(1:10,1:10)), msec)) may be provided at a transition between state block A and state block B. The temporal operator may include textual code (e.g., fft(y(1:10,1:10))) understood by textual engine 228 of TCE 220. The temporal operator may cause the state chart to transition from state block A to state block B when a certain amount (e.g., equal to a fast Fourier transform of variable y(1:10,1:10)) of milliseconds (msec) have elapsed. In example 700, assume that the user instructs TCE 220 to execute the state chart by entering an "execute state chart" command or by selecting an "execute state chart" button, as further shown in FIG. 7A.

TCE 220 may execute the state chart based on the user's instructions. When the state chart is executed by TCE 220, state block A may execute the textual code (e.g., en: y=u1+u2) to generate results. State block B may be entered when the condition of the temporal operator is satisfied (e.g., after fft(y(1:10,1:10)) milliseconds have elapsed). State block B may execute the textual code (e.g., en: z=0.7*sin(y)), and may output results of the execution.

Figure 7B:
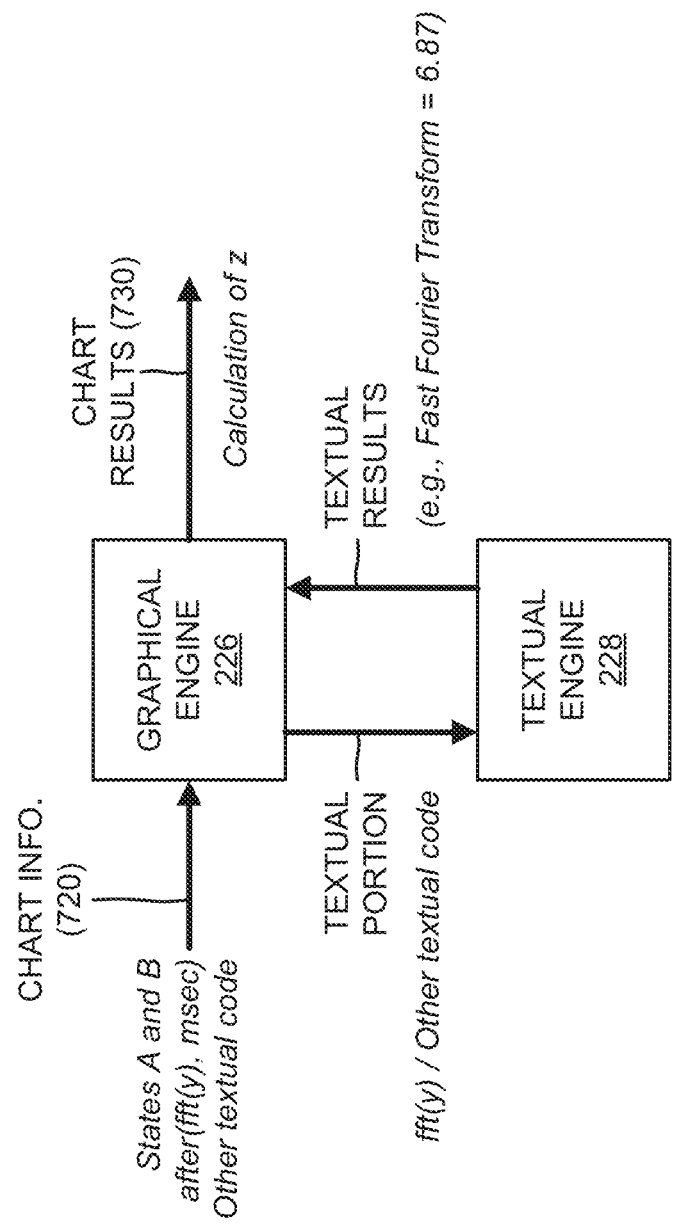

As shown in FIG. 7B, when executing the state chart, TCE 220 may provide chart information 720 to graphical engine 226 of TCE 220. Chart information 720 may include, for example, information associated with the arrangement of state block A and state block B, information associated with the temporal operator (e.g., after(fft(y(1:10,1:10)), msec)), and information associated with other textual code (e.g., the textual code provided in state block A and state block B). Graphical engine 226 may divide chart information 720 into a textual portion and a graphical portion. In example 700, assume that the textual portion includes the syntax fft(y(1:10,1:10)) of the temporal operator and the other textual code (e.g., provided in state blocks A and B). Further, assume that the graphical portion includes the syntax after and msec of the temporal operator and the information associated with the arrangement of state block A and state block B.

As further shown in FIG. 7B, graphical engine 226 may provide the textual portion to textual engine 228, and textual engine 228 may process the textual portion to generate textual results. In example 700, assume that textual engine 228 calculates y(1:10,1:10), variable z, and the fast Fourier transform of y(1:10,1:10) (e.g., as being equal to 6.87). The calculations of y(1:10,1:10), variable z, and the fast Fourier transform of y(1:10,1:10) may be referred to as textual results. Textual engine 228 may provide the textual results to graphical engine 226. Graphical engine 226 may process the graphical portion to generate graphical results. In example 700, assume that graphical engine 226 determines whether the condition "after 6.87 milliseconds" is satisfied. The determination of whether the condition is satisfied may be referred to as graphical results. Graphical engine 226 may combine the textual results with the graphical results to generate chart results 730. In example 700, assume that chart results 730 include the final calculation of variable z. TCE 220 may cause client device 210 to display chart results 730 to the user and/or to store chart results 730.

Figure 7C:
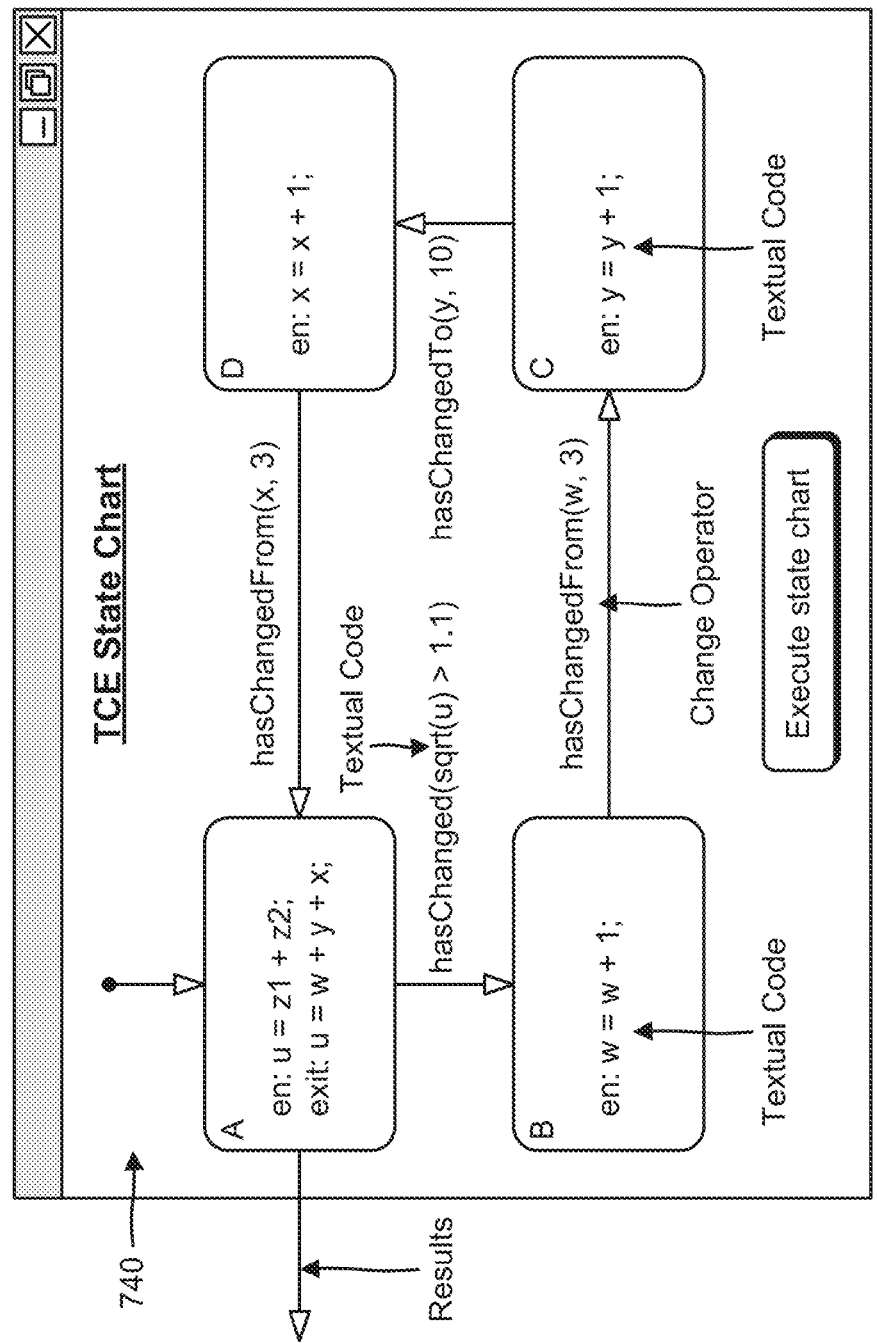

Now, assume that the user utilizes TCE 220 to create another state chart or to import the other state chart into TCE 220. As shown in FIG. 7C, TCE 220 may cause client device 210 to display the other state chart in a user interface 740 as the user creates the other state chart or after the user imports the other state chart. The other state chart may include a first state block (e.g., state block A), a second state block (e.g., state block B), a third state block (e.g., state block C), and a fourth state block (e.g., state block D). State block A may include a representation of a first calculation to be performed, state block B may include a representation of a second calculation to be performed, state block C may include a representation of a third calculation to be performed, and state block D may include a representation of a fourth calculation to be performed. As further shown in FIG. 7C, state block A may include textual code (e.g., en: u=z1+z2; and exit: u=w+y+x); state block B may include textual code (e.g., en: w=w+1); state block C may include textual code (e.g., en: y=y+1); and state block D may include textual code (e.g., en: x=x+1). The textual code of state blocks A-D may be understood by textual engine 228 of TCE 220.

As further shown in FIG. 7C, a first change operator (e.g., hasChanged(sqrt(u)>1.1)) may be provided at a transition between state block A and state block B. The first change operator may include textual code (e.g., sqrt(u)>1.1) understood by the textual environment of TCE 220. The first change operator may cause the state chart to transition from state block A to state block B when the square root of variable u changes (e.g., to greater than 1.1) from a beginning of a last time step to a beginning of a current time step. The operator ">" may behave differently in an array-based language than in a scalar form. For example, if u is an array, then the sqrt operator may generate an array. A comparison with 1.1 may be made for the array and a logical result may be that every element of u is larger than 1.1 or that only one element of u is larger than 1.1.

As further shown in FIG. 7C, a second change operator (e.g., hasChangedFrom(w, 3)) may be provided at a transition between state block B and state block C. The second change operator may include textual code (e.g., w) understood by the textual environment of TCE 220. In some implementations, a change operator hasChangedFrom(array1, array2) may indicate that array1 is different at least in one element from array2. The second change operator may cause the state chart to transition from state block B to state block C when variable w changes from a value (e.g., "3") since a last time step.

As further shown in FIG. 7C, a third change operator (e.g., hasChangedTo(y, 10)) may be provided at a transition between state block C and state block D. The third change operator may include textual code (e.g., y) understood by the textual environment of TCE 220. The third change operator may cause the state chart to transition from state block C to state block D when variable y changes to a value (e.g., "10") in a current time step.

As further shown in FIG. 7C, a fourth change operator (e.g., hasChangedFrom(x, 3)) may be provided at a transition between state block D and state block A. The fourth change operator may include textual code (e.g., x) understood by the textual environment of TCE 220. The fourth change operator may cause the state chart to transition from state block D to state block A when variable x changes from a value (e.g., "3") since a last time step.

In example 700, assume that the user instructs TCE 220 to execute the other state chart by entering an "execute state chart" command or by selecting an "execute state chart" button, as further shown in FIG. 7C. TCE 220 may execute the other state chart based on the user's instructions. When the other state chart is executed by TCE 220, state block A may execute the textual code (e.g., en: u=z1+z2) to generate results. State block A may transition to state block B when the conditions of the first change operator are satisfied (e.g., when the square root of variable u changes to greater than 1.1 between time steps). State block B may execute the textual code (e.g., en: w=w+1) to generate results.

State block B may transition to state block C when the conditions of the second change operator are satisfied (e.g., when variable w changes from "3" since a last time step). State block C may execute the textual code (e.g., en: y=y+1) to generate results. State block C may transition to state block D when the conditions of the third change operator are satisfied (e.g., when variable y changes to "10" in a current time step). State block D may execute the textual code (e.g., en: x=x+1) to generate results. State block D may transition to state block A when the conditions of the fourth change operator are satisfied (e.g., when variable x changes from "3" since a last time step). State block A may execute the textual code (e.g., exit: u=w+y+x) and may output results of the execution.

Figure 7D:
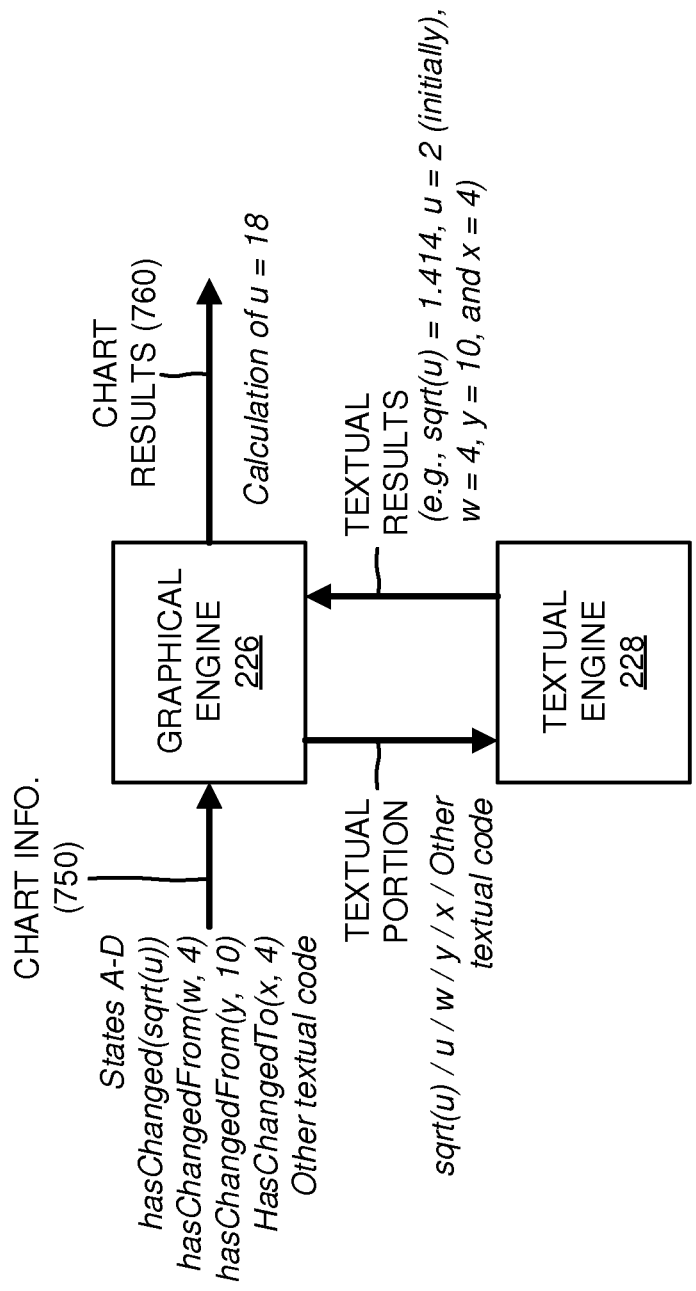

As shown in FIG. 7D, when executing the other state chart, TCE 220 may provide chart information 750 to graphical engine 226 of TCE 220. Chart information 750 may include, for example, information associated with the arrangement of state blocks A-D, information associated with the change operators (e.g., hasChanged, hasChanged-From, and hasChangedTo), and information associated with other textual code (e.g., the textual code provided in state blocks A-D). Graphical engine 226 may divide chart information 750 into a textual portion and a graphical portion. In example 700, assume that the textual portion includes the syntax sqrt(u)>1.1, u, w, y, and x of the change operators and the other textual code. Further, assume that the graphical portion includes the syntax hasChanged, hasChangedFrom, and hasChangedTo of the change operators and the information associated with the arrangement of state blocks A-D.

As further shown in FIG. 7D, graphical engine 226 may provide the textual portion to textual engine 228, and textual engine 228 may process the textual portion to generate textual results. In example 700, assume that variables z1, z2, w, y, and x all equal one (1) initially. Further, assume that textual engine 228 calculates variable u (e.g., initially as equal to 2), variable w (e.g., until variable w is equal to 4), variable y (e.g., until variable y is equal to 10), variable x (e.g., until variable x is equal to 4), and the square root of variable u (e.g., as being equal to 1.414 which is greater than 1.1). The calculations of variable u, variable w, variable y, variable x, and the square root of variable u may be referred to as textual results. Textual engine 228 may provide the textual results to graphical engine 226, and graphical engine 226 may process the graphical portion to generate graphical results. In example 700, assume that graphical engine 226 determines whether the conditions of the change operators are satisfied. The determination of whether the conditions are satisfied may be referred to as graphical results. Graphical engine 226 may combine the textual results with the graphical results to generate chart results 760. In example 700, assume that chart results 760 include the final calculation of variable u (e.g., w +y +x =4 +10 +4 =18). TCE 220 may cause client device 210 to display chart results 760 to the user and/or to store chart results 760.

As indicated above, FIGS. 7A-7D are provided merely as an example. Other examples are possible and may differ from what was described with regard to FIGS. 7A-7D.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

User interfaces may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user of a technical computing environment (TCE) (e.g., via a touch screen display, a mouse, a keyboard, a keypad, voice commands, etc.).

The term code is to be broadly interpreted to include text-based code that may not require further processing to execute (e.g., C++ code, Hardware Description Language (HDL) code, very-high-speed integrated circuits (VHSIC) HDL(VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, code may include different combinations of the above-identified classes (e.g., text-based code, binary code, text files, etc.). Alternatively, or additionally, code may include code generated using a dynamically-typed programming language (e.g., the M language, a MATLAB® language, a MATLAB-compatible language, a MATLAB-like language, etc.) that can be used to express problems and/or solutions in mathematical notations. Alternatively, or additionally, code may be of any type, such as function, script, object, etc., and a portion of code may include one or more characters, lines, etc. of the code.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more."

Where only one item is intended, the term "one" or similar language is used. Further, the phrase "based on" is intended to mean "based, at least in part, on" unless explicitly stated otherwise.

What is claimed is:

1. A method, comprising:
receiving a state chart generated via a technical computing environment,
the state chart including at least one state block, and
the receiving the state chart being performed by a device;
receiving a time-based operator or an event-based operator associated with the at least one state block,
the time-based operator or the event-based operator including textual code that is understood by a textual engine of the technical computing environment,
a portion of the time-based operator or the event-based operator not being understood by a graphical engine of the technical computing environment, and
the receiving the time-based operator or the event-based operator being performed by the device;
transforming the portion of the time-based operator or the event-based operator into a form that is understood by the graphical engine of the technical computing environment,
the transforming the portion of the time-based operator or the event-based operator being performed by the device;
initiating execution of the state chart,
the initiating the execution of the state chart being performed by the device;
processing, during the execution of the state chart, the transformed portion of the time-based operator or the event-based operator and the at least one state block with the graphical engine of the technical computing environment to generate graphical results,
the processing the transformed portion of the time-based operator or the event-based operator being performed by the device;
processing, during the execution of the state chart, the textual code of the time-based operator or the event-based operator with the textual engine to generate textual results,
the processing the textual code being performed by the device; and
combining the graphical results with the textual results to generate chart results,
the combining being performed by the device.

2. The method of claim 1, further comprising one of:
displaying the chart results; or
storing the chart results in a memory associated with the device.

3. The method of claim 1, where:
the at least one state block includes a first state block and a second state block,
a transition is provided between the first state block and the second state block, and
the time-based operator or the event-based operator is associated with the transition.

4. The method of claim 1, where:
the time-based operator generates a condition based on a sample rate of the state chart and based on the textual code, or
the event-based operator automatically checks whether a variable value has changed since a last time a state is activated.

5. The method of claim 1, where the time-based operator or the event-based operator refers to an elapsed simulation time or a change of events.

6. The method of claim 1, where the time-based operator or the event-based operator includes a keyword that enables a unit of time interval to be specified for the time-based operator or the event-based operator.

7. The method of claim 1, further comprising:
receiving an instruction to initiate execution of the state chart; and
initiating the execution of the state chart based on the instruction.

8. A device, comprising:
one or more processors to:
receive a state chart generated via a technical computing environment,
the state chart including at least one state block,
receive a time-based operator or an event-based operator associated with the at least one state block,
the time-based operator or the event-based operator including textual code that is understood by a textual engine of the technical computing environment,
a portion of the time-based operator or the event-based operator not being understood by a graphical engine of the technical computing environment,
transform the portion of the time-based operator or the event-based operator into a form that is understood by the graphical engine of the technical computing environment
initiate execution of the state chart,
process, during the execution of the state chart, the transformed portion of the time-based operator or the event-based operator and the at least one state block with the graphical engine to generate graphical results,
process, during the execution of the state chart, the textual code of the time-based operator or the event-based operator with the textual engine to generate textual results, and
combine the graphical results with the textual results to generate chart results.

9. The device of claim 8, where the one or more processors are further to one of:
display the chart results, or
store the chart results in a memory associated with the device.

10. The device of claim 8, where:
the at least one state block includes a first state block and a second state block,
a transition is provided between the first state block and the second state block, and
the time-based operator or the event-based operator is associated with the transition.

11. The device of claim 8, where:
the time-based operator generates a condition based on a sample rate of the state chart and based on the textual code, or
the event-based operator automatically checks whether a variable value has changed since a last time a state is activated.

12. The device of claim 8, where the time-based operator or the event-based operator refers to an elapsed simulation time or a change of events.

13. The device of claim 8, where the time-based operator or the event-based operator includes a keyword that enables a unit of time interval to be specified for the time-based operator or the event-based operator.

14. The device of claim 8, where the time-based operator or the event-based operator includes an operator of a general form:

operator(code), where operator corresponds to the time-based operator or the event-based operator and code corresponds to the textual code provided in the time-based operator or the event-based operator.

15. A non-transitory computer-readable medium storing instructions, the instructions comprising:

one or more instructions that, when executed by one or more processors of a device, cause the one or more processors to:

receive a state chart generated via a technical computing environment, the state chart including at least one state block, and the at least one state block including first textual code understood by a textual engine of the technical computing environment, receive a time-based operator or an event-based operator associated with the at least one state block, the time-based operator or the event-based operator including second textual code that is understood by the textual engine, a portion of the time-based operator or the event-based operator not being understood by a graphical engine of the technical computing environment, transform the portion of the time-based operator or the event-based operator into a form that is understood by the graphical engine of the technical computing environment, initiate execution of the state chart, process, during the execution of the state chart, the transformed portion of the time-based operator or the event-based operator and the at least one state block with the graphical engine of the technical computing environment to generate graphical results, process, during the execution of the state chart, the first textual code and the second textual code with the textual engine to generate textual results, combine the graphical results with the textual results to generate chart results, and output or store the chart results.

16. The non-transitory computer-readable medium of claim 15, where:

the at least one state block includes a first state block and a second state block, a transition is provided between the first state block and the second state block, and the time-based operator or the event-based operator is associated with the transition.

17. The non-transitory computer-readable medium of claim 15, where:

the time-based operator generates a condition based on a sample rate of the state chart and based on the second textual code, or the event-based operator automatically checks whether a variable value has changed since a last time a state is activated.

18. The non-transitory computer-readable medium of claim 15, where the time-based operator or the event-based operator refers to an elapsed simulation time or a change of events.

19. The non-transitory computer-readable medium of claim 15, where the time-based operator or the event-based operator includes a keyword that enables a unit of time interval to be specified for the time-based operator or the event-based operator.

20. The non-transitory computer-readable medium of claim 15, where the time-based operator or the event-based operator includes an operator of a general form:

operator(code), where operator corresponds to the time-based operator or the event-based operator and code corresponds to the second textual code provided in the time-based operator or the event-based operator.

* * * * *